US009360636B2

(12) United States Patent
Marrs et al.

(10) Patent No.: US 9,360,636 B2
(45) Date of Patent: Jun. 7, 2016

(54) RE-TERMINABLE LC CONNECTOR ASSEMBLY AND CAM TERMINATION TOOL

(75) Inventors: Samuel M. Marrs, Bradley, IL (US); Jerry A. Wiltjer, Frankfort, IL (US); Shaun P. Brouwer, St. John, IN (US)

(73) Assignee: Panduit Corp., Tinley Park, IL (US)

( * ) Notice: Subject to any disclaimer, the term of this patent is extended or adjusted under 35 U.S.C. 154(b) by 751 days.

(21) Appl. No.: 13/599,369

(22) Filed: Aug. 30, 2012

(65) Prior Publication Data

US 2012/0328246 A1 Dec. 27, 2012

Related U.S. Application Data

(63) Continuation of application No. 13/893,109, filed on Sep. 29, 2010, now Pat. No. 8,256,970, and a continuation of application No. 12/039,078, filed on Feb. 28, 2008, now Pat. No. 7,806,600, and a continuation of application No. 11/262,660, filed on Oct. 31, 2005, now Pat. No. 7,346,256.

(60) Provisional application No. 60/624,820, filed on Nov. 4, 2004.

(51) Int. Cl.
*G02B 6/38* (2006.01)

(52) U.S. Cl.
CPC ............ *G02B 6/3846* (2013.01); *G02B 6/3802* (2013.01); *G02B 6/3858* (2013.01); *G02B 6/3869* (2013.01); *G02B 6/3877* (2013.01); *G02B 6/3806* (2013.01); *G02B 6/3887* (2013.01); *G02B 6/3898* (2013.01)

(58) Field of Classification Search
CPC .. G02B 6/3846; G02B 6/3858; G02B 6/3869; G02B 6/3877; G02B 6/3802; G02B 6/3887; G02B 6/3806; G02B 6/3898

USPC .............. 385/62, 81, 87, 95, 97, 98, 99, 134, 385/136, 137
See application file for complete search history.

(56) References Cited

U.S. PATENT DOCUMENTS

| 4,558,501 | A | 12/1985 | Moulin et al. |
| 4,684,208 | A | 8/1987 | Ishikawa et al. |
| 4,755,018 | A | 7/1988 | Heng et al. |
| 4,919,509 | A | 4/1990 | Miller et al. |
| 5,146,525 | A | 9/1992 | Tabone |

(Continued)

FOREIGN PATENT DOCUMENTS

| EP | 0628841 A1 | 12/1994 |
| EP | 1072914 A2 | 1/2001 |
| EP | 1327901 A2 | 7/2003 |

*Primary Examiner* — Ryan Lepisto
(74) *Attorney, Agent, or Firm* — Christopher S. Clancy; James H. Williams; Yuri Astvatsaturov

(57) ABSTRACT

An improved, reversibly terminable fiber stub connector assembly is provided that can be readily and positively terminated in the field using simple termination tools. This allows repositioning or replacement of fiber optic cable field fibers if termination is not acceptable in performance. The tool may be a hand-held tool, or used in conjunction with a connector support structure to provide simplified and expeditious field termination of fiber optic cables. The cam tool can include a throughbore that enables connection of a patchcord to the stub fiber of the connector during or shortly after termination without removal of the termination tool. Accordingly, field testing of the connection can be made at the site of termination.

6 Claims, 24 Drawing Sheets

(56) References Cited

U.S. PATENT DOCUMENTS

| | | |
|---|---|---|
| 5,394,496 A | 2/1995 | Caldwell et al. |
| 6,022,150 A | 2/2000 | Erdman et al. |
| 6,173,097 B1 | 1/2001 | Throckmorton et al. |
| 6,224,270 B1 | 5/2001 | Nakajima et al. |
| 6,238,101 B1 | 5/2001 | Chen et al. |
| 6,422,764 B1 | 7/2002 | Marrs |
| 6,464,402 B1 | 10/2002 | Andrews et al. |
| 6,604,867 B2 | 8/2003 | Radek et al. |
| 6,859,604 B2 | 2/2005 | Marrs |
| 6,918,704 B2 | 7/2005 | Marrs et al. |
| 7,011,454 B2 * | 3/2006 | Caveney et al. ............... 385/87 |
| 7,104,702 B2 | 9/2006 | Barnes et al. |
| 7,270,487 B2 | 9/2007 | Billman et al. |
| 2005/0036744 A1 | 2/2005 | Caveney et al. |
| 2005/0213890 A1 | 9/2005 | Barnes et al. |
| 2005/0265666 A1 | 12/2005 | Johnson |

* cited by examiner

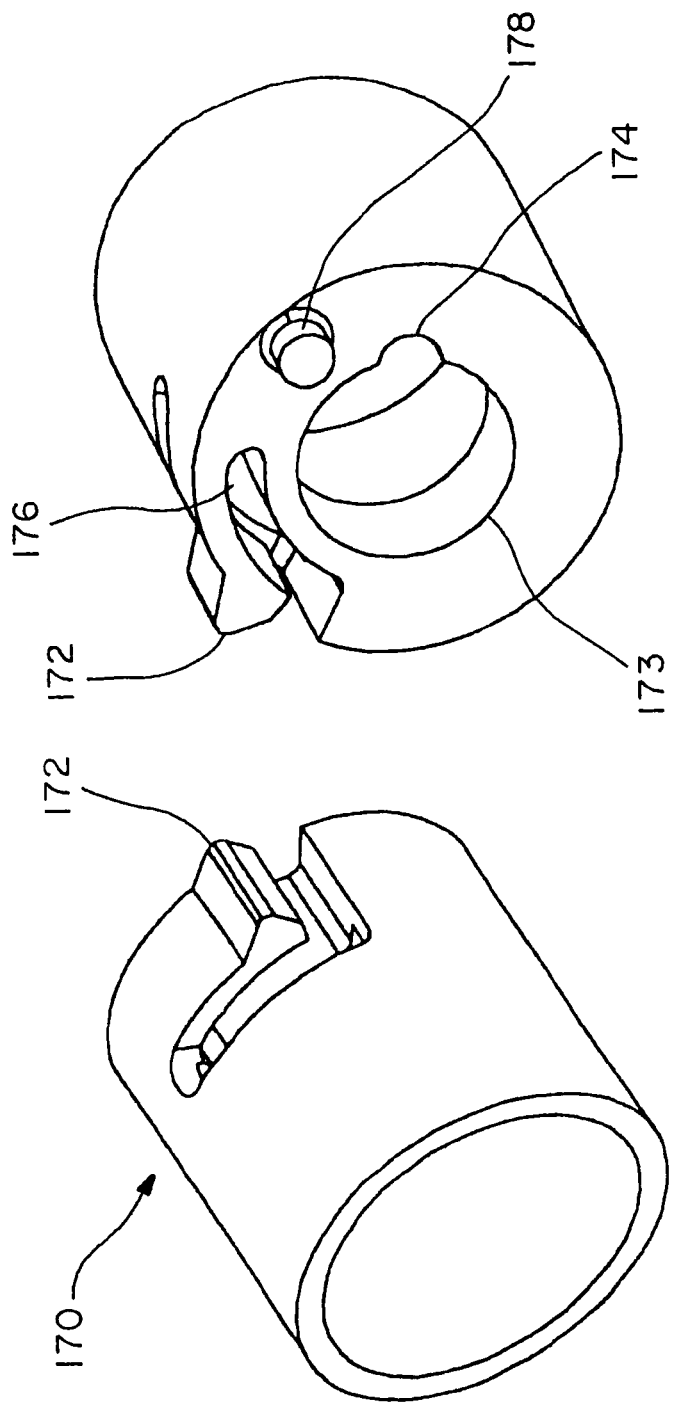

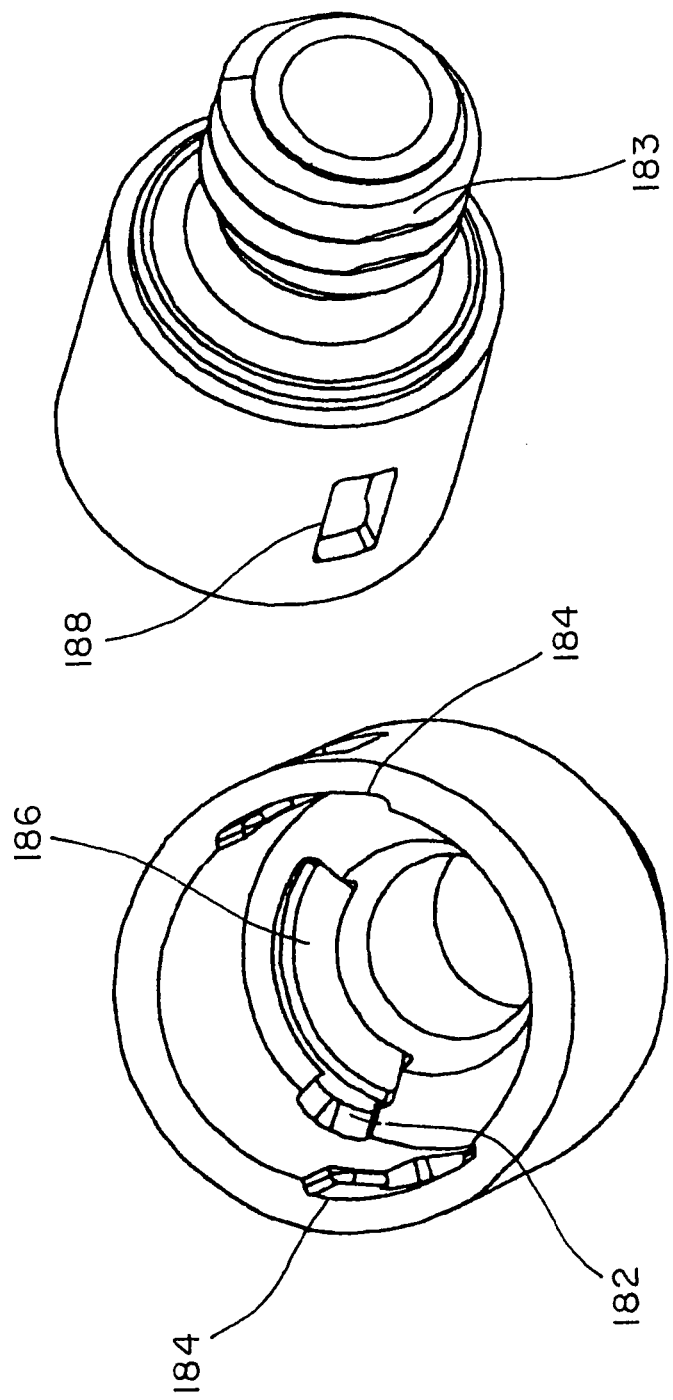

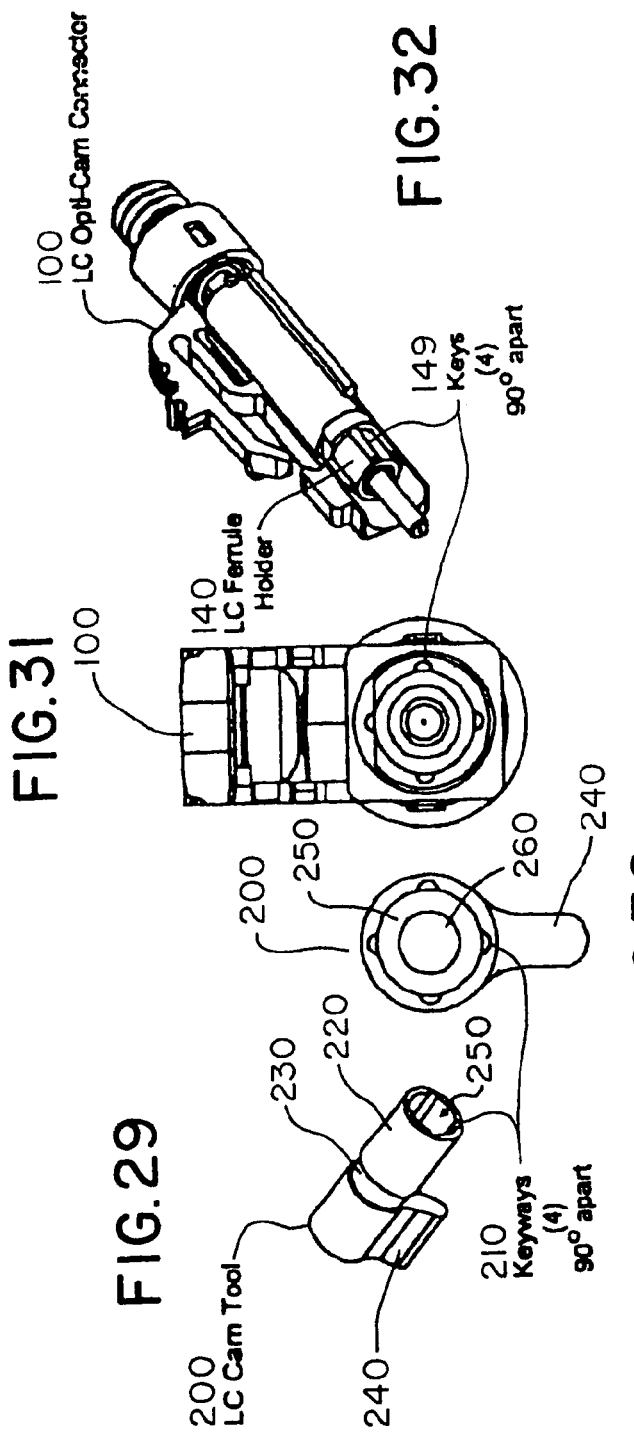
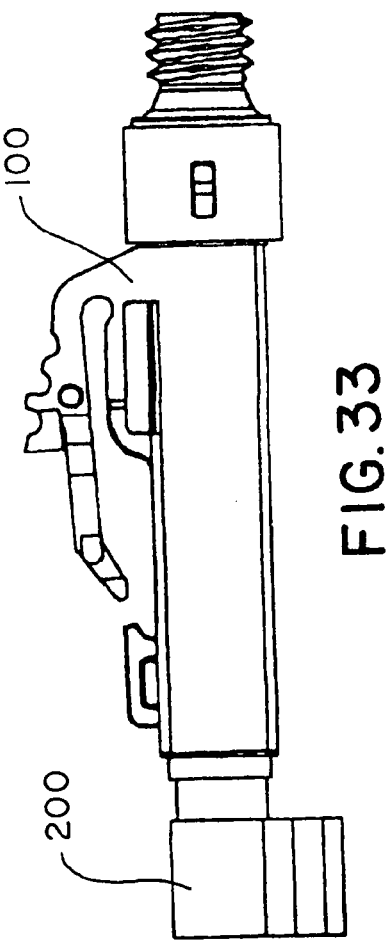

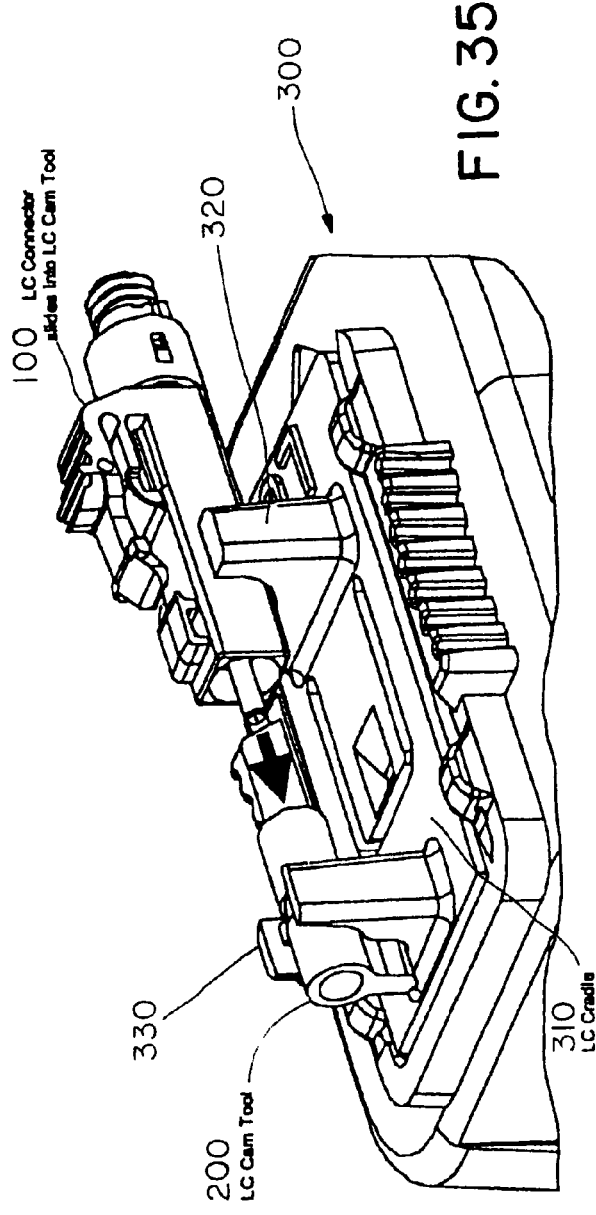
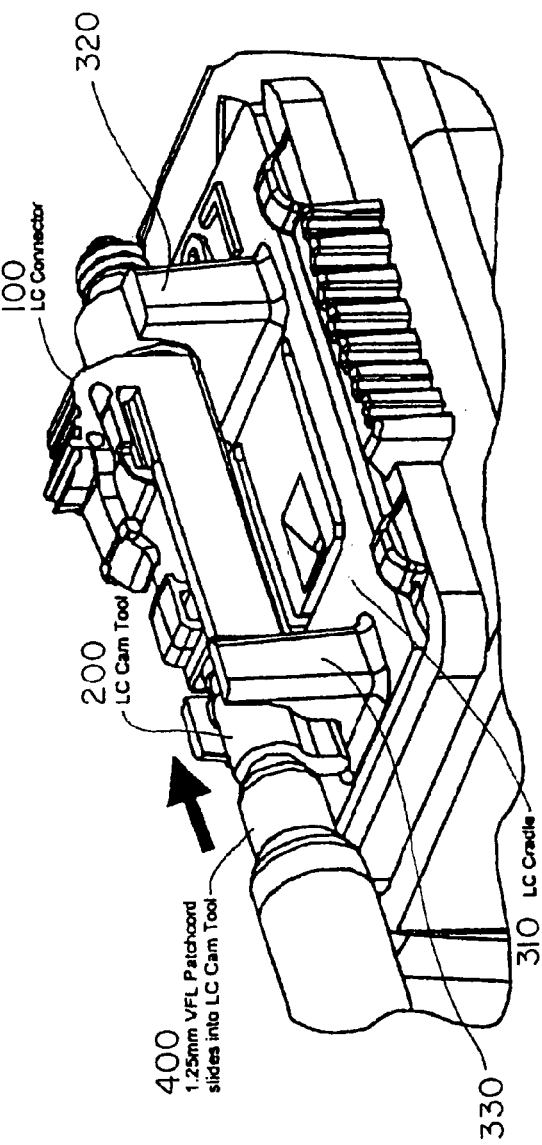

RE-TERMINABLE LC CONNECTOR ASSEMBLY AND CAM TERMINATION TOOL

CROSS REFERENCE TO RELATED APPLICATIONS

This application is a continuation of U.S. patent application Ser. No. 12/893,109, filed Sep. 29, 2010; which is a continuation of U.S. patent application Ser. No. 12/039,078, filed Feb. 28, 2008, which issued as U.S. Pat. No. 7,806,600 on Oct. 5, 2010; which is a continuation of U.S. patent application Ser. No. 11/262,660, filed Oct. 31, 2005, which issued as U.S. Pat. No. 7,346,256 on Mar. 18, 2008, which claims priority to U.S. Provisional Application Ser. No. 60/624,820 filed Nov. 4, 2004, the entire contents of which are incorporated herein by reference.

BACKGROUND OF THE INVENTION

1. Field of Invention

A re-terminable LC connector assembly includes a spring-loaded ferrule holder assembly and a reusable actuation system for termination of the assembly. An LC connector termination and cam tool enables ready assembly, termination and adjustment of the LC connector assembly.

2. Description of Related Art

Fiber optic networks are becoming increasingly commonplace in telecommunications applications due to their increased bandwidth and distance capabilities relative to copper networks. However, compared to copper systems, fiber optic cables and connections are well known for their more critical and difficult termination.

Alignment between abutted glass cores within a fiber optic interface is crucial to the performance of the connection. Additionally, field installation of standard "pot and finish" fiber optic connectors is extremely labor and expertise intensive. In most applications, an installer is required to prepare a fiber end, glue the fiber end in the connector, cleave the excess fiber from the endface of the connector, and polish the endface of the connector to obtain the optimum geometry for optical performance. Endface polishing is difficult and time-consuming step, particularly when using single mode fiber, which achieves best performance when using an automated polishing machine. However, automated polishing machines are often large and expensive, rendering them impractical for field use.

Fiber pigtail connectors were designed to eliminate the need for these lengthy steps. A pigtail connector is factory-prepared with a length of fiber. In the factory, precise polishing machines can be used to achieve a consistent polish. The endfaces can be inspected at the factory to ensure correct endface geometry for optimum performance. In the field, the installer splices a length of fiber to a cable by means of a fusion splicing machine. This eliminates much of the labor time, but requires the installer to purchase a fusion splicing machine and protective sleeve, which are also expensive. This type of connector requires extra storage for protection of the fusion splice.

Fiber stub connectors were designed to eliminate the need for fusion splicing equipment, splice protection, and lengthy termination steps. The fiber stub connector employs a short fiber stub that is spliced to the field fiber within the connector. Stub connectors typically require a crimp to either activate the splice or retain the field fiber, or both. However, the crimping operations, whether occurring at the interface point or at some other point to retain the field fiber, have a tendency to pull the field fiber and stub fiber apart, or otherwise damage the signal-passing function of the interface.

If the connection is found to be poor after the crimping occurs, the connector must be cut off because crimping is most often an irreversible operation. This wastes a stub fiber connector and a length of fiber optic cable and requires a new connector and fiber optical cable end to be terminated. This wastes both parts and labor, and can be an annoyance to a field installer by delaying installation.

A reusable stub connector is desirable. One known reusable or re-terminable fiber stub connector is disclosed in commonly assigned U.S. application Ser. No. 10/647,848 filed Aug. 25, 2003, the subject matter of which is hereby incorporated herein by reference in its entirety.

SUMMARY

Advantageous features are an improved fiber stub connector assembly that is readily and positively terminated in the field using simple termination tools. In exemplary embodiments, the fiber stub connector assembly is reversibly terminated to allow repositioning or replacement of fiber optic cable field fibers if termination is not acceptable in performance.

In exemplary embodiments, a simplified fiber termination cam tool readily actuates an internal cam mechanism of the connector assembly through rotation to releasably terminate the fiber connection in the connector. The tool may be a hand-held tool, or used in conjunction with a connector support structure to provide simplified and expeditious field termination of fiber optic cables. In exemplary embodiments, the cam tool can include a throughbore that enables connection of a patchcord to the stub fiber of the connector during or shortly after termination without removal of the termination tool. Accordingly, field testing of the connection can be made at the site of termination. Moreover, because the exemplary connectors incorporate reversible termination connections, improperly terminated connections can be reversed and the field fiber either repositioned and reterminated, or a fresh field fiber can be provided for a new connection.

Other features and advantages will be recognized when read in light of the following disclosure.

BRIEF DESCRIPTION OF THE DRAWINGS

Various exemplary embodiments will be described in detail, with reference to the following figures, wherein:

FIGS. 10-11 are perspective front and rear views, respectively, of an exemplary cam detent mechanism;

FIGS. 12-13 are front and rear perspective views, respectively, of an exemplary backbone;

FIG. 29 is a perspective view of an exemplary LC cam tool showing a plurality of internal keyways;

FIG. 30 is an end view of the LC cam tool showing the LC cam tool keyways;

FIG. 31 is an end view of the exemplary LC Opti-Cam connector showing a corresponding plurality of keys that mate with the LC cam tool keyways;

FIG. 32 is a perspective partial cutaway view of the LC Opti-Cam connector showing a ferrule holder with the keys;

FIG. 33 is a side view of the LC cam tool installed in the LC Opti-Cam connector;

FIG. 35 is a partial view of the LC cradle of FIG. 34 with the LC cam tool installed and an LC connector being slid into engagement;

FIG. 36 is a partial view of the LC cradle of FIG. 34 with the LC cam tool installed and the LC connector being in engagement with the tool;

DETAILED DESCRIPTION OF PREFERRED EMBODIMENTS

Figure 2:
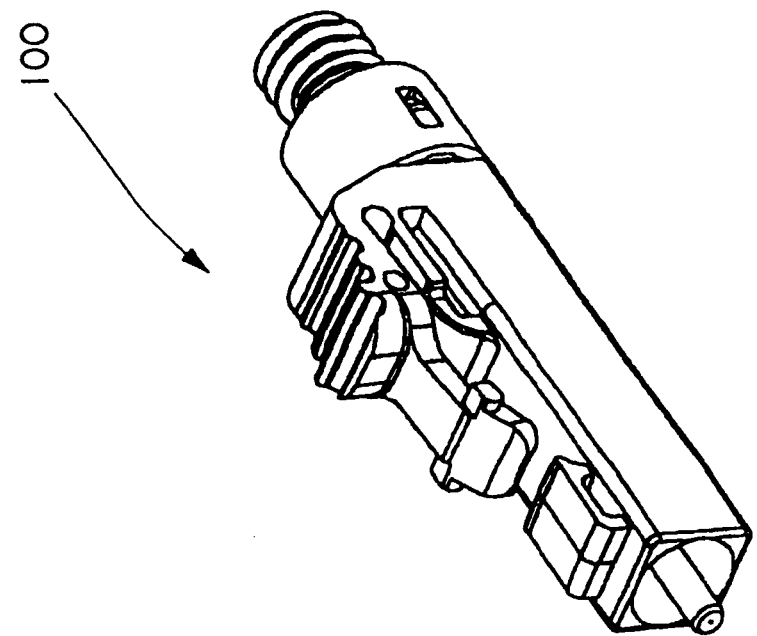
FIGS. 1 and 2 are perspective views of a fully assembled re-terminable LC-type connector, with dust caps and boots omitted for clarity, according to a preferred embodiment.
Figure 1:
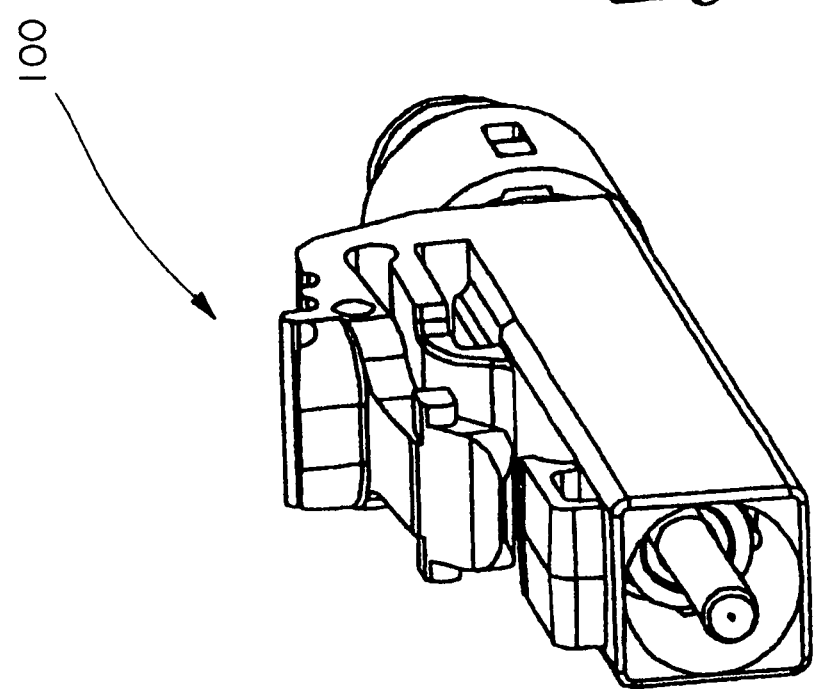
Figure 3:
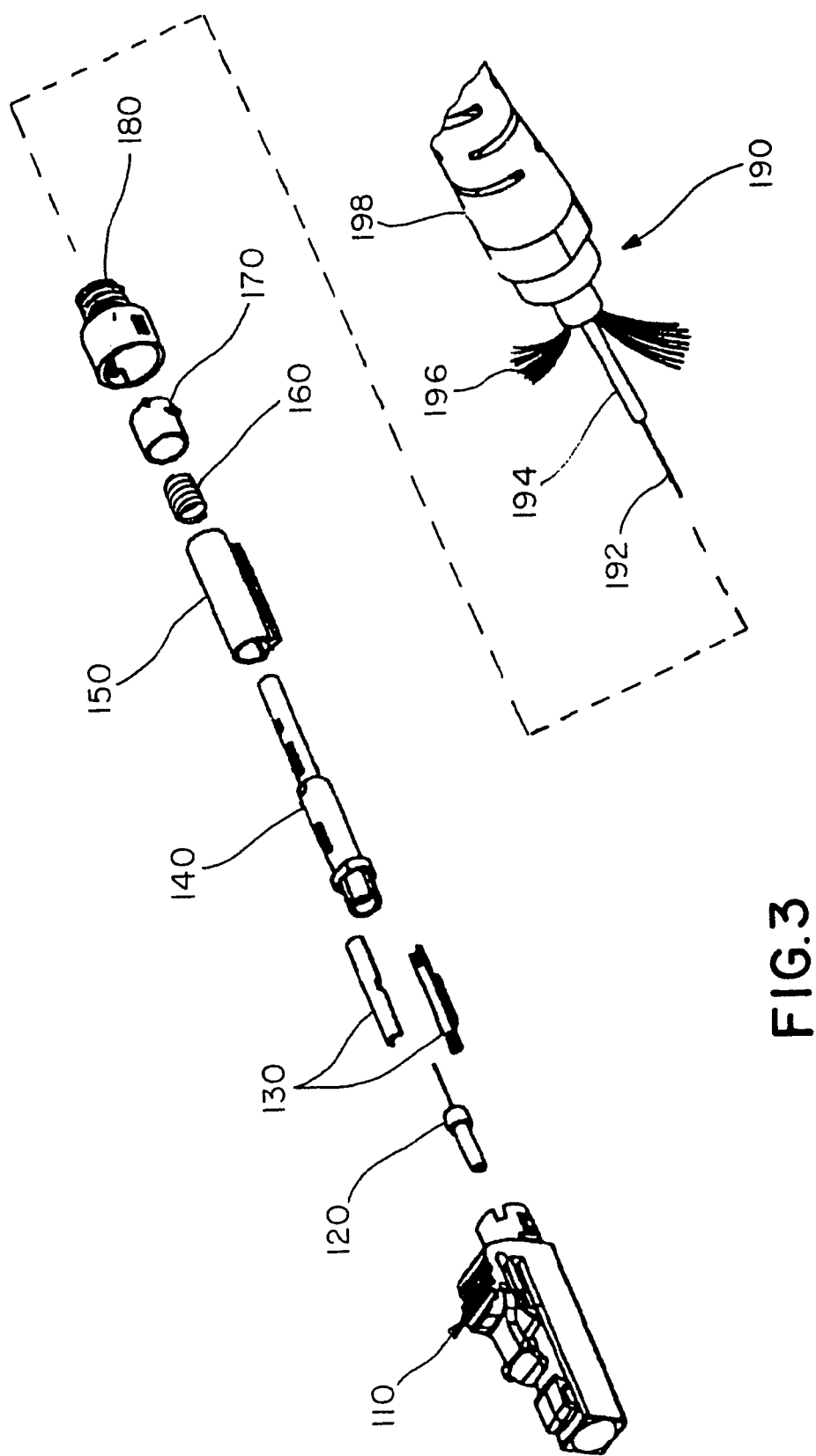
FIG. 3 is an exploded view of the LC-type Opti-Cam connector of FIGS. 1-2.

An exemplary embodiment of a re-terminable LC type fiber optic connector will be illustrated with reference to FIGS. 1-27. The fully assembled connector assembly 100 is shown in FIGS. 1-2 and an exploded view is shown in FIG. 3. LC connector assembly 100 includes an LC connector housing 110, stub ferrule assembly 120, planks 130, ferrule holder 140, cam sleeve 150, compression spring 160, cam detent 170, and backbone 180 that terminate a fiber optic cable 190. Cable 190 includes a field fiber 192, buffer 194, fibers 196, and outer body 198.

Figure 4:
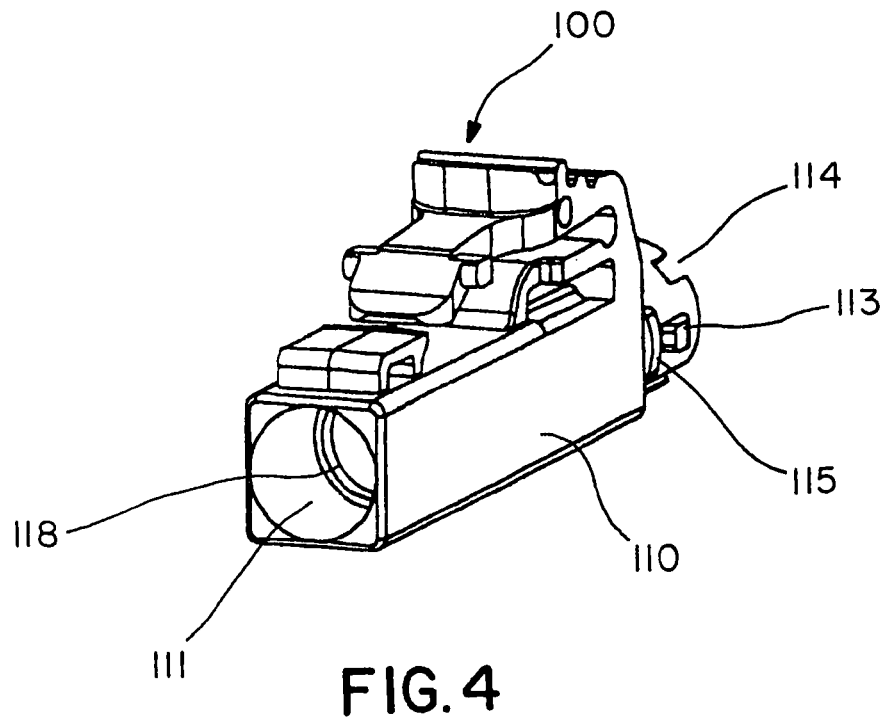
FIGS. 4 and 5 show perspective front and rear views, respectively, of an exemplary connector housing.
Figure 5:
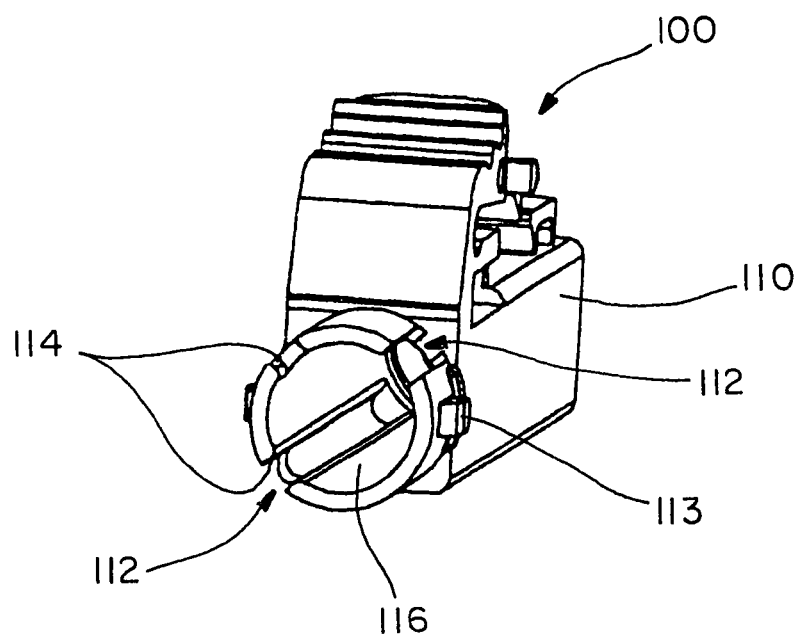

Additional details of each component of LC connector assembly 100 will be described with reference to FIGS. 4-15. FIGS. 4-5 illustrate front and rear views of connector housing 110. A front bore 111 allows access to ferrule holder 140 when using cam termination tool 200 (FIGS. 28-42). The rear bore includes a longitudinal keying groove 116 that mates with keying rib 156 (FIGS. 8-9) of cam sleeve 150 to maintain the cam sleeve orientation relative to connector housing 110. The rear bore also includes detent notches 114 that lock the connector orientation before and after 90 degree cam rotation travel. This feature keeps the connector orientation either in the cammed position or the un-cammed position. A spring latch 172 (FIGS. 10-11) from cam detent 170 snaps into the detent notches 114. This feature keeps the connector orientation either in the cam position or the un-cam position.

The angle and radii of the spring latch 172 assist in controlling the amount of force required to rotate the connector housing 110 and disengage the spring latch 172 from the notches 114. A notch 112 allows the back of housing 110 to flex in, making clearance for the backbone 180 to snap over the latches 113 on housing 110. A locking rib 182 of backbone 180 (FIG. 12) slides into the notch 112 to eliminate the ability of the housing 110 backend to flex in during loading of the backbone 180 under test. This feature can also make the connector tamper proof by not allowing the backbone 180 to be removed without breaking the parts. Latches 113 snap into pockets 188 on backbone 180 (FIGS. 12-13) and hold the connector assembly 100 together.

Tamper rib 115 slides into the recess groove 184 of backbone 180 (FIGS. 12-13) and eliminates the ability to remove the backbone 180 from housing 110 without breaking the components. Ferrule holder assembly stop 118 is provided on the interior of the bore 111 and keeps the ferrule assembly 140 from removal out of the front of housing 110.

Figure 6:
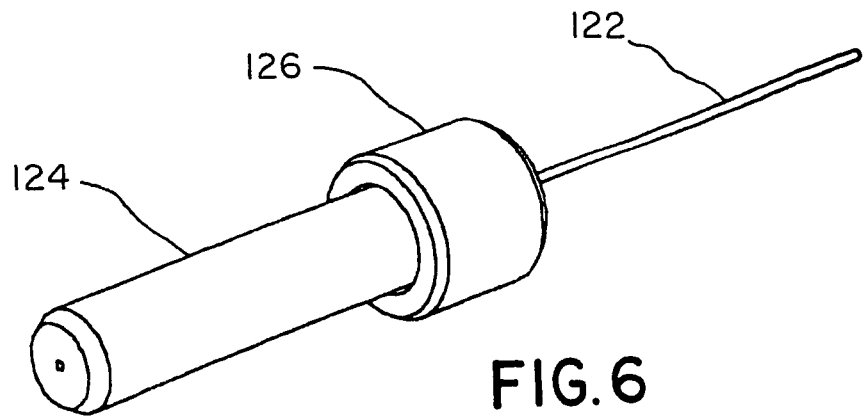
FIG. 6 is a perspective view of an exemplary stub ferrule assembly.

FIG. 6 illustrates details of the stub ferrule assembly 120, which includes a stub fiber 122, a ferrule 124, and a shoulder spacer 126. The stub fiber 122 is bonded inside ferrule 124 and cleaved and polished. The spacer 126 is pressed over the backend to create a shoulder that takes up the space in the ferrule holder bore 143 (FIGS. 7A-7B) where the planks 132 and 134 (FIG. 3) are assembled inside of the ferrule holder 140. Shoulder spacer 126 is made to press over the ferrule 124 and inside ferrule holder assembly 140. Once the stub ferrule assembly 120 is pressed inside the ferrule holder 140, the components are glued in place.

Figure 22:
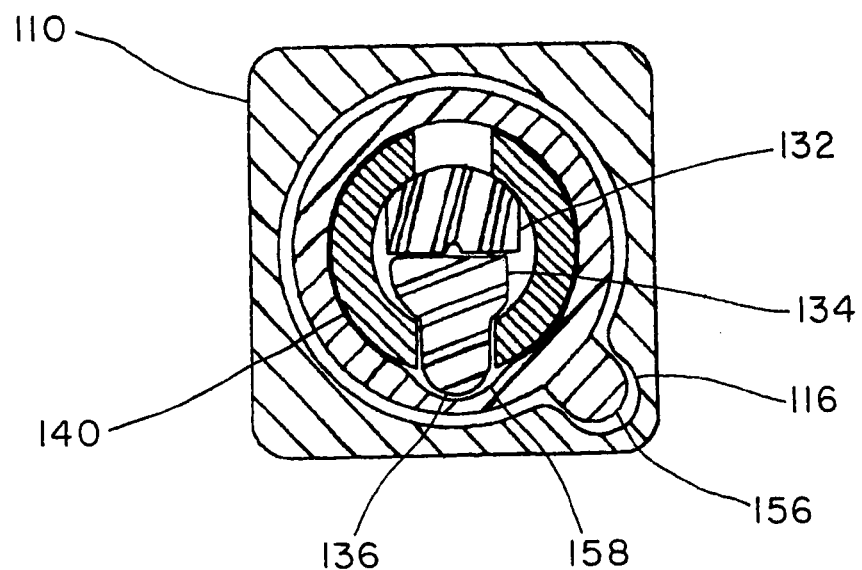
FIG. 22 shows a cross-section through a fiber clamping system before termination.
Figure 23:
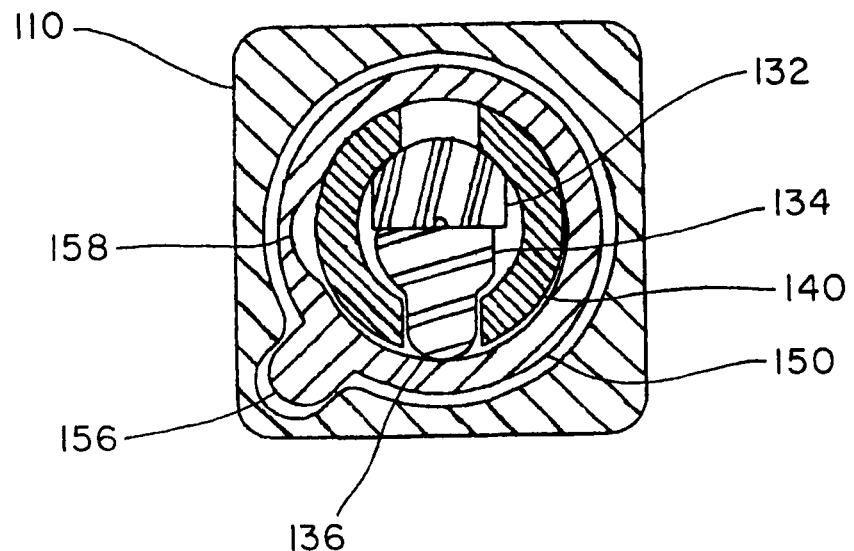
FIG. 23 shows a cross-section of the fiber clamping system of FIG. 22 after termination.

The fiber retaining planks 130 (FIG. 3) include upper plank 132 and lower plank 134 (see FIGS. 22 and 23). Lower plank 134 includes a longitudinal extending and radially outward projecting rib 136 while upper plank 132 includes a mating face with a V-groove for receiving stub fiber 122 and field fiber 192. Both planks 132 and 134 are assembled inside ferrule holder 140. The lower clamp plank 134 may be assembled first and can be pushed to the side of the bore so that rib 136 protrudes out of plank rib slit 142 in ferrule holder 140. Once the clamping plank 134 is sufficiently seated, the V-groove plank 132 can be installed. The stub ferrule assembly 120 may then be pressed and glued into ferrule holder assembly 140. This traps the planks 130 (both clamping plank 134 and V-groove plank 132) inside ferrule holder 140.

Figure 7A:
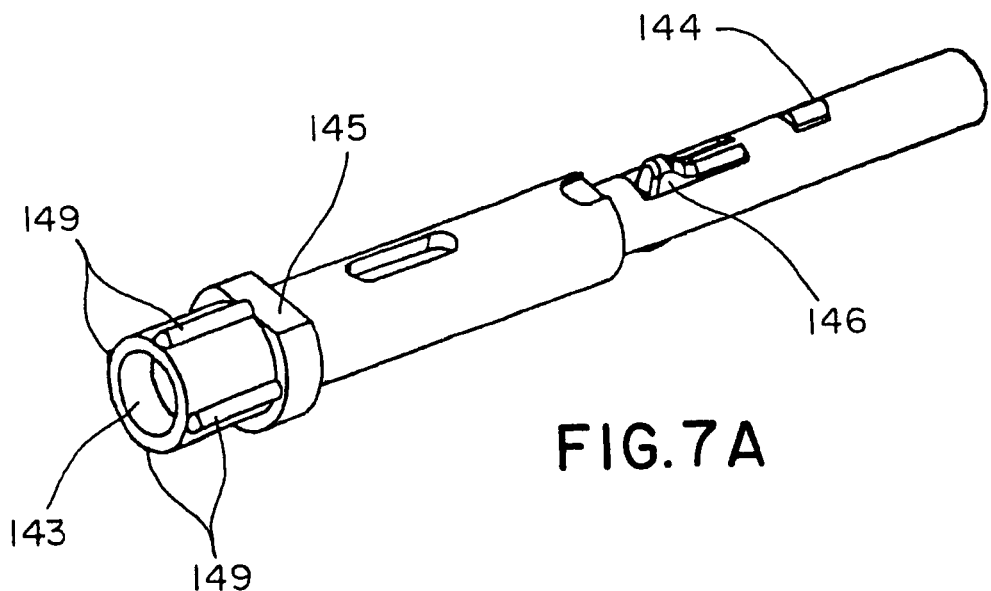
FIGS. 7A-7B are perspective front and rear views of an exemplary ferrule holder assembly.
Figure 7B:
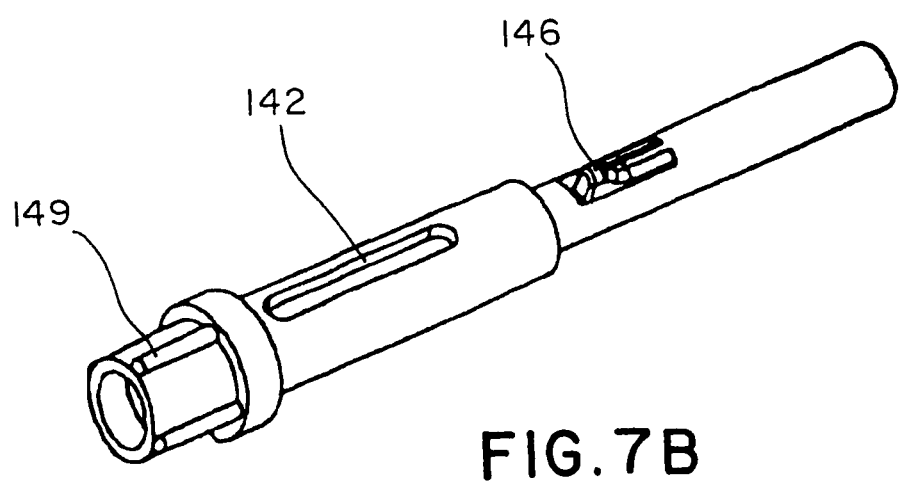

FIGS. 7A and 7B illustrate details of the ferrule holder 140. Ferrule holder 140 includes a press/ferrule holder bore 143 that receives the stub ferrule assembly 120 by press fit. The stub ferrule assembly is then bonded by a suitable adhesive to ensure high ferrule retention in the finished product. A plurality of keying ribs 149 are provided around the outer periphery of the bore 143. In an exemplary embodiment shown, four keying ribs 149 are provided, each being 90 degrees apart. However, other keying arrangements can be provided. The keying pattern is designed to mate with an associated cam termination tool 200 (see FIGS. 35-38). Ferrule holder 140 is also preferably provided with at least one key flat 145. The flat helps key this component in place during the assembly process of the planks 130 and stub ferrule assembly 120.

At least one, and preferably two, buffer clamp arms 146 are provided around the periphery of the ferrule holder. Preferably, the clamp arms are symmetrically provided around the periphery. In the illustrated embodiment, two clamp arms 146 are provided diametrically opposed to each other. One is shown in the top view of FIG. 7A while the other is shown in the bottom view of FIG. 7B. The dual buffer clamp arms 146 clamp onto the buffered fiber 190 after the cam sleeve 150 is rotated 90 degrees via the housing 110. By using at least dual clamp arms, a substantially uniform clamping pressure can be applied on the buffered fiber clamped by the arms.

The cam detent 170 (FIGS. 10-11) and ferrule holder 140 must retain the same orientation so that the detent system works within the designed degree of rotation, e.g., 90 degrees or any other desirable rotation angle. This can be achieved by provision of a detent key 144 that protrudes radially outward from the ferrule holder assembly 140 as shown in FIG. 7A. In exemplary embodiments, detent key 144 is designed so as to not disengage the cam detent 170 during linear travel motion of the ferrule holder assembly 140 or normal operation of the connector. The lower side of ferrule holder assembly 140 is provided with a plank rib slit 142 that allows the clamping plank rib 136 of lower plank 134 (FIG. 3) to protrude through the casing of the ferrule holder assembly 140. This also allows the cam sleeve 150 to compress the planks 132 and 134 together during the termination process.

Figure 8:
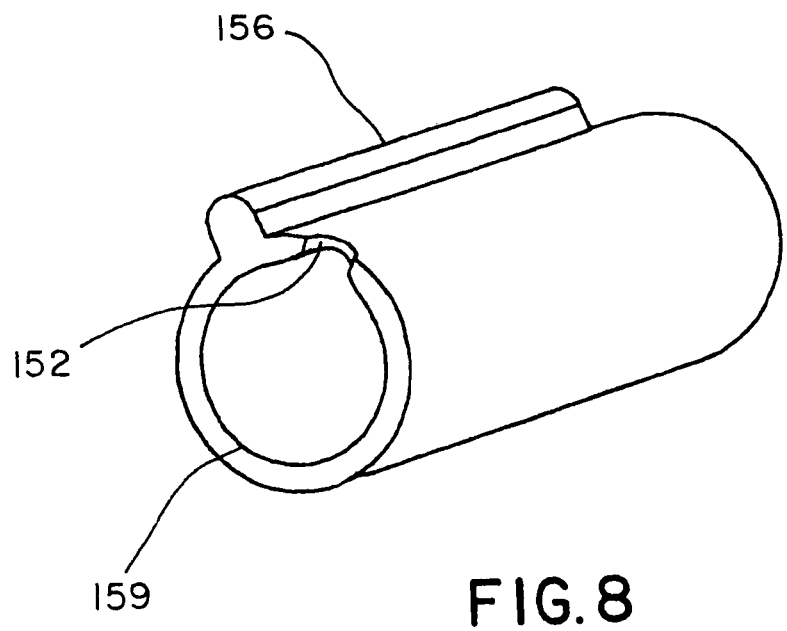
FIGS. 8-9 are perspective front and rear views, respectively, of an exemplary cam sleeve.
Figure 9:
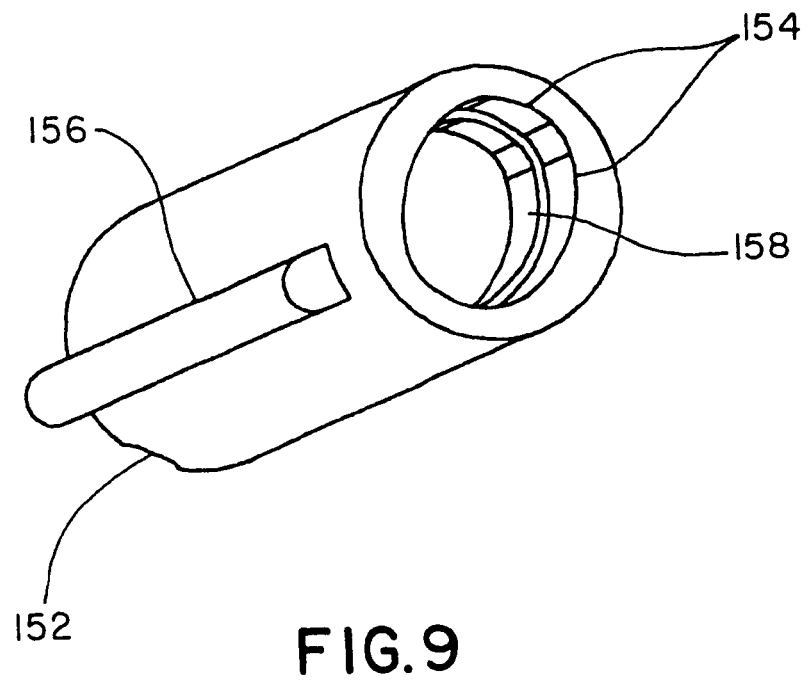

FIGS. 8 and 9 describe details of an exemplary cam sleeve 150. A longitudinal keying rib 156 is provided on the outer periphery of cam sleeve 150. Keying rib 156 mates with keying groove 116 provided on connector housing 110 to lock the orientation of the cam sleeve 150 for rotation with connector housing 110. However, other keying structures can be provided. An assembly notch 152 is preferably provided to help orient the cam sleeve 150 when installing it onto ferrule holder assembly 140. This can be achieved, for example, by notch 152 forming a viewing window that can be aligned with the clamping plank's rib 136, which is protruding through plank rib slit 142 of ferrule holder assembly 140.

An interior periphery of cam sleeve 150 has a predetermined cam profile that, when the cam sleeve 150 is rotated relative to ferrule holder 140, compresses the clamping plank 134 inside ferrule holder assembly 140 between first and second positions. The first position is preferably an unconstrained and unterminated position where the clamping plank exerts little or no clamping force on the field or stub fibers and the second position is preferably a constrained and terminated position where the clamping plank 134 is compressed to generate a sufficient clamping pressure on the field and stub fibers to retain them between the planks 132, 134. The inner bore of cam sleeve 150 is also provided with a buffer cam profile 154 that mates with the dual buffer clamp arms 146 of ferrule holder assembly 140 to generate a clamping pressure that retains a buffered fiber when the assembly is rotated to the terminated position. Preferably, rings 158 are provided that snap over the dual buffer clamp arms 146 on ferrule holder assembly 140 to lock the cam sleeve 150 onto the ferrule holder assembly 140.

The compression spring 160 (FIG. 3) is trapped between the cam sleeve 150 and the cam detent 170 to forward bias the ferrule holder assembly 140 in the connector housing.

FIGS. 10 and 11 describe details of the cam detent 170. Cam detent 170 includes a spring latch 172 that snaps into notches 114 of connector housing 110 to control the amount of force required to rotate the cam 90 degrees between terminated and unterminated positions. The angle and height of the latch 172 are preferably optimized to control the amount of force required. A stop post 178 extends longitudinally from one end of cam detent 170 and interacts with an arcuate detent groove 186 (FIGS. 12-13) within backbone 180 to restrict cam rotation to a desired range of motion, such as the illustrated 90 degrees. However, other ranges of motion could be substituted. Key groove 174 is provided to key the orientation of the cam detent 170 with the ferrule holder assembly 140. This feature ensures that the cam detent 170 rotates in unison with the ferrule holder assembly 140 and independent of the housing 110, cam sleeve 150, and backbone 180 components. A notch relief 176 allows latch 172 to deflect and the housing 110 and cam sleeve 150 to rotate freely. A cam detent ferrule holder bore 173 is sized with a diameter that is preferably optimized to allow a maximum amount of angular float in the connector while maintaining the desired keying system with the ferrule holder assembly 140.

FIGS. 12 and 13 describe details of the backbone 180. A recess groove 184 reduces the amount of stress on the walls of the backbone 180 when the housing latches 113 are snapped into pockets 188. Additionally, tamper ribs 115 (FIGS. 4-5) can be provided to slide into this area and prevent the removal of the backbone without breaking one of the components. This provides an optional tamper proof component to the assembly. Detent groove 186 controls the rotation of the housing 110 in relation to the ferrule holder 140 assembly by defining the degree of freedom of the system and providing specific stop positions where stop post 178 is constrained. External threads 183 may be provided on the rear exterior periphery as shown to trap Kevlar from the jacketed fiber optic cable 190 between the backbone 180 and a Kevlar nut assembly (not shown). This generates high cable retention loads and forms a strain relief mechanism for the fiber optic cable. A locking rib 182 is provided on the interior of backbone 180 that slides into notch 112 of housing 110 to prevent the backbone 180 from being removed without breaking one of the components to provide another tamper proof function.

Figure 14:
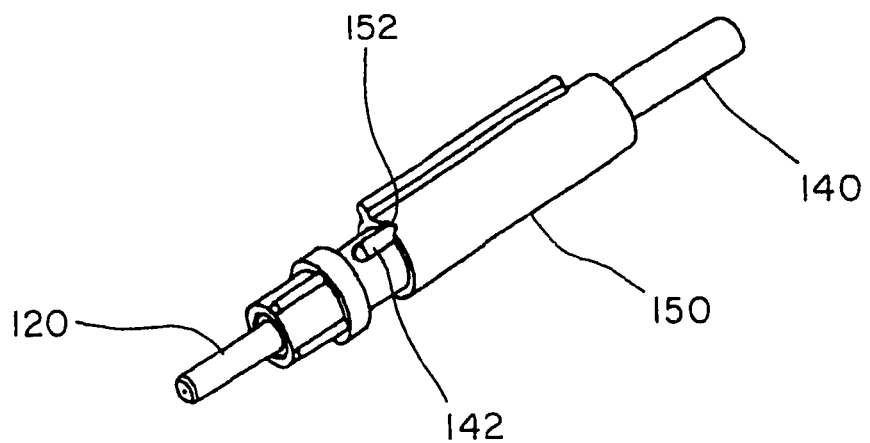
FIGS. 14-15 are perspective views of an exemplary ferrule holder assembly in a partially assembled and fully assembled state, respectively.
Figure 15:
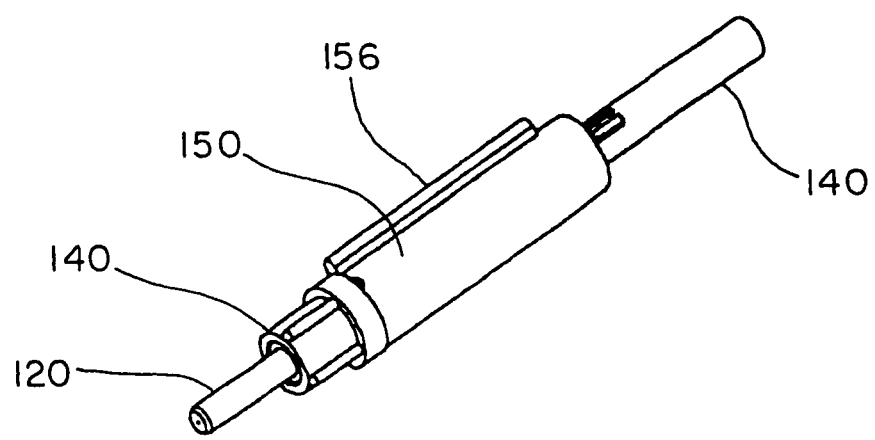

As better shown in FIGS. 14-15, ferrule holder assembly 140 receives stub ferrule assembly 120 at its front end and receives cam sleeve 150 over its rear end. During assembly, alignment notch 152 is used to align with the longitudinal slit 142 while cam sleeve 150 is positioned over the assembly 140. FIG. 14 shows the two assemblies in a partially assembled state, while FIG. 15 shows the two assemblies in a fully assembled state.

Figure 16:
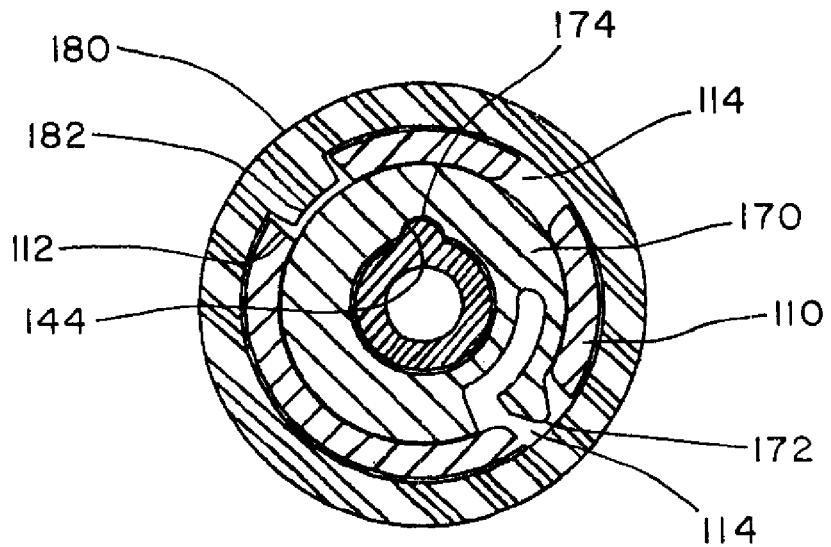
FIG. 16 shows a cross-sectional view of a cam detent system in the rear of the housing before termination.
Figure 17:
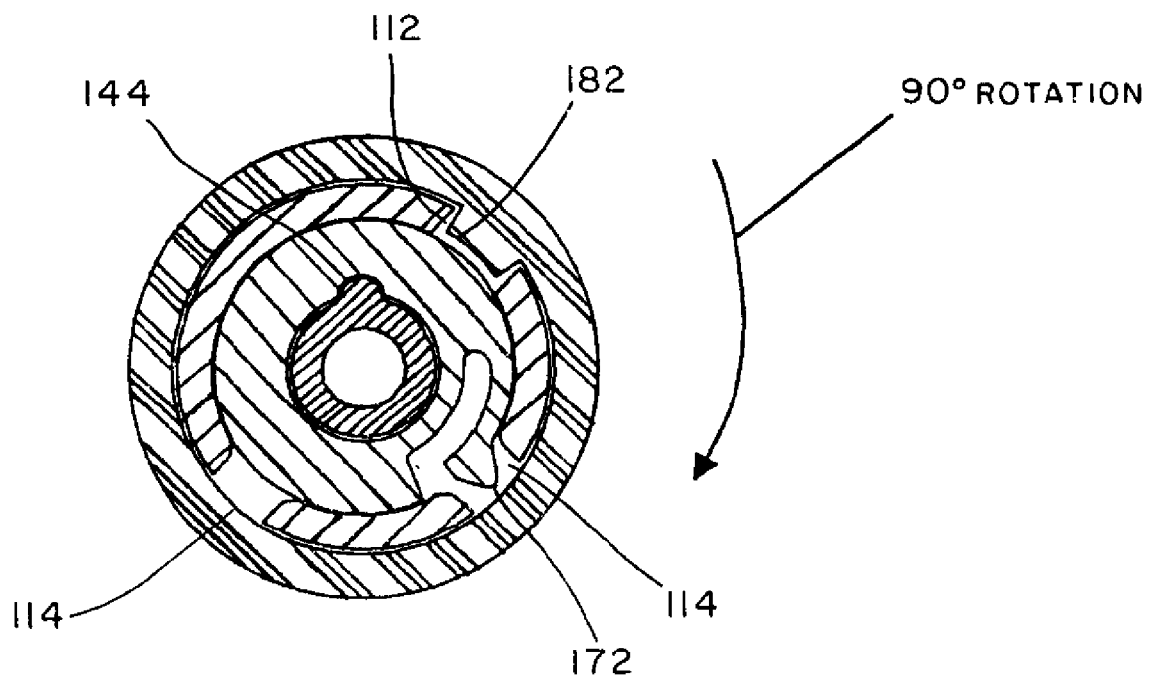
FIG. 17 shows a cross-sectional view of the cam detent system of FIG. 16 after termination.

FIGS. 16-17 show cross-sectional views of cam detent system details near the rear of housing 110 both before (FIG. 16) and after (FIG. 17) termination. Housing 110 has backbone 180 coaxially provided over its exterior while cam detent 170 is coaxially provided on the interior of housing 110. Inward protrusion 182 of backbone 180 is received within corresponding channel 112 of housing 110. Ferrule holder 140 is coaxially located on the interior of cam detent 170 with longitudinally extending protrusion 144 mating with corresponding channel 174 of cam detent 170. As shown, spring-biased protrusion 172 of cam detent 170 is received within corresponding detent notch 114 of housing 110.

The initial (unterminated) orientation is as shown in FIG. 16. However, when the backbone 180 is rotated 90 degrees in the direction shown in FIG. 17, the housing 110 and cam sleeve 150 (not shown) also rotate. Notice, however, that ferrule holder 140 and cam detent 170 do not rotate when backbone 180 is rotated. This is achieved through retention of ferrule holder assembly 140 by cam tool 200 as better illustrated in FIGS. 35-39.

Figure 18:
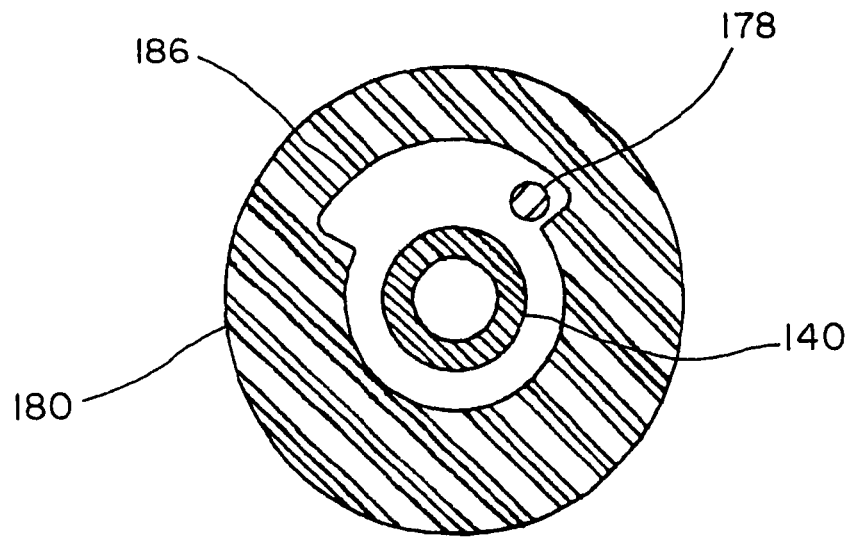
FIG. 18 shows a cross-section through the cam detent system and a backbone stop system before termination.
Figure 19:
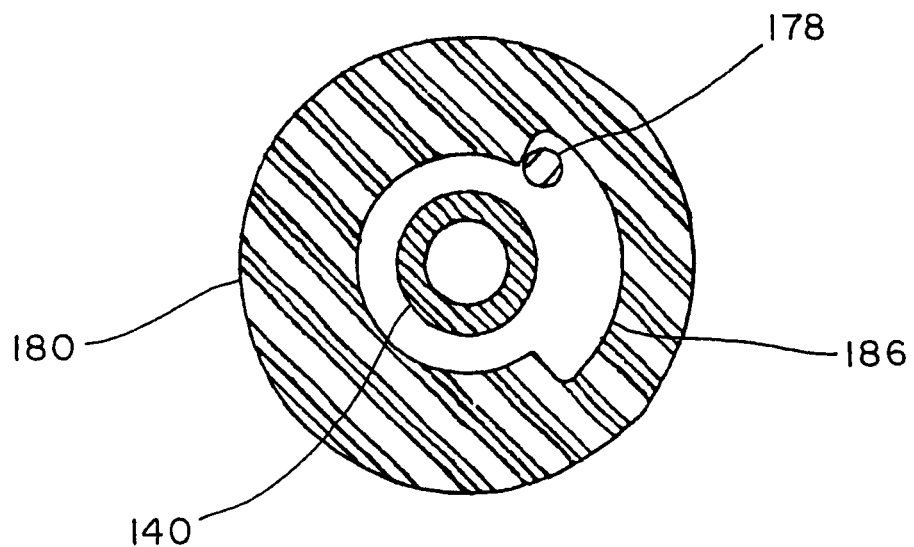
FIG. 19 shows a cross-section through the cam detent system and backbone stop system of FIG. 18 after termination.

FIGS. 18-19 show cross-sectional views of cam detent 170 and backbone 180 in which details of a stop system are illustrated both before and after termination. In particular, these Figures show arcuate detent groove 186 of backbone 180 defining an angular rotation range for stop post 178 protruding longitudinally from cam detent 170. In a preferred embodiment, the chord section of arcuate detent groove 186 forms positive stops that allow a 90 degree rotation of the cam detent 170 relative to backbone 180.

Figure 20:
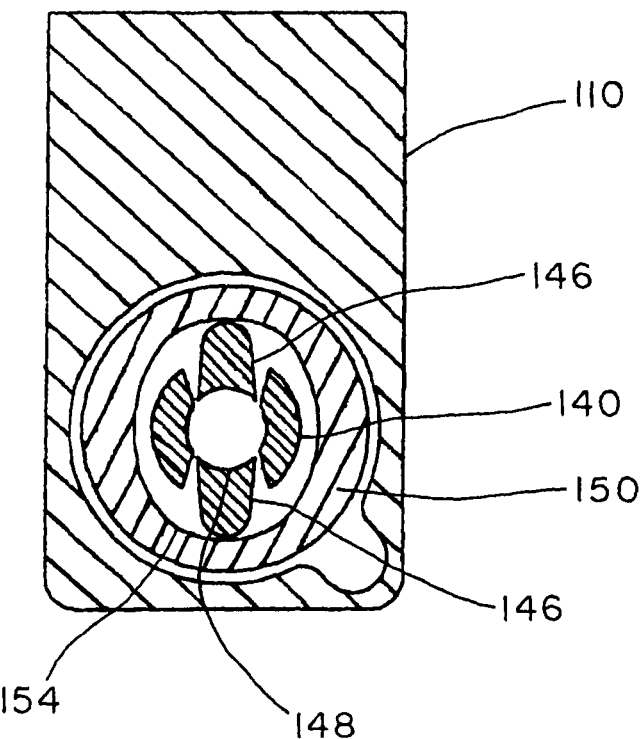
FIG. 20 shows a cross-section through a buffer clamping system before termination.
Figure 21:
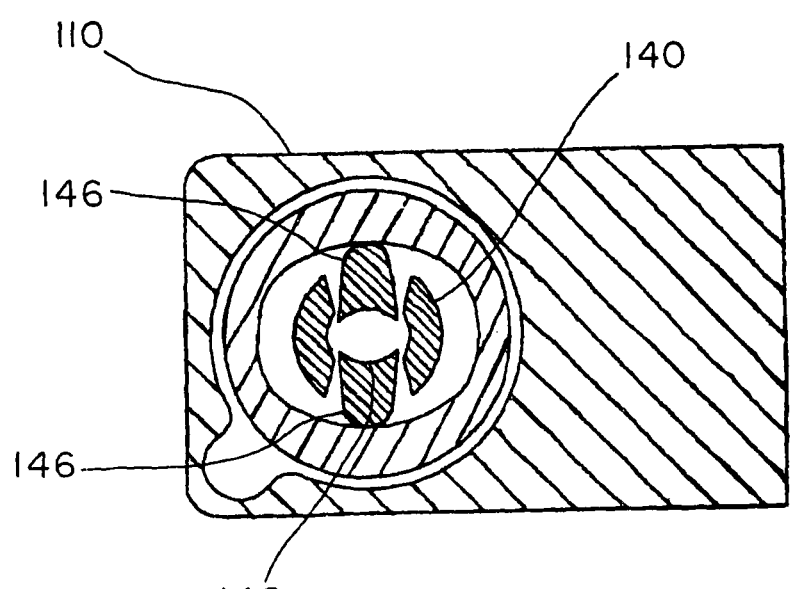
FIG. 21 shows a cross-section through the buffer clamping system of FIG. 20 after termination.

FIGS. 20-21 illustrate a buffer clamping system provided within LC connector assembly 100. Connector housing 110 receives cam sleeve 150 therein. Cam sleeve 150 defines a hollow interior portion 154 that is in an oval or otherwise cammed, non-circular shape. Ferrule holder 140 has a substantially cylindrical outer profile, with buffer clamping arms 146 initially extending radially outward to define a substantially circular interior buffer fiber bore 148 for receiving buffer 194 of fiber optic cable 190. However, upon termination, by rotation of housing 110 relative to ferrule holder 140, the interior cam profile 154 changes orientation. This profile when rotated urges buffer clamping arms 146 radially inward, causing a decrease in the size of the buffer fiber bore 148. This results in a compression force that will retain the buffer 194 of fiber optic cable 190 (FIG. 3) fixedly in place.

FIGS. 22-23 illustrate a fiber clamping system used to clamp field fiber 192 of cable 190 between upper plank 132 and lower plank 134 of plank members 130. Before termination, as shown in FIG. 22, planks 132 and 134 are initially spaced apart to receive field fiber 192 therebetween. Connector housing 110 includes a longitudinal protruding channel 116 that receives a mating rib 156 of cam sleeve 150. This locks rotation of the cam sleeve 150 with connector housing 110. Cam sleeve 150 also includes an internal cam profile 158 that before termination opposes a protruding rib 136 and allows the protruding rib to project through plank rib slit 142 in ferrule holder 140.

During rotation, housing 110 and cam sleeve 150 rotate around ferrule assembly 140. During this rotation, however, the internal cam profile 158 of cam sleeve 150 moves away from protruding rib 136. This provides a camming action that compresses lower plank 134 towards upper plank 132 and creates a positive clamping force on the field fiber 192 and stub fiber 122 provided between the opposed plank halves 132, 134 as shown in FIG. 23.

Figure 24:
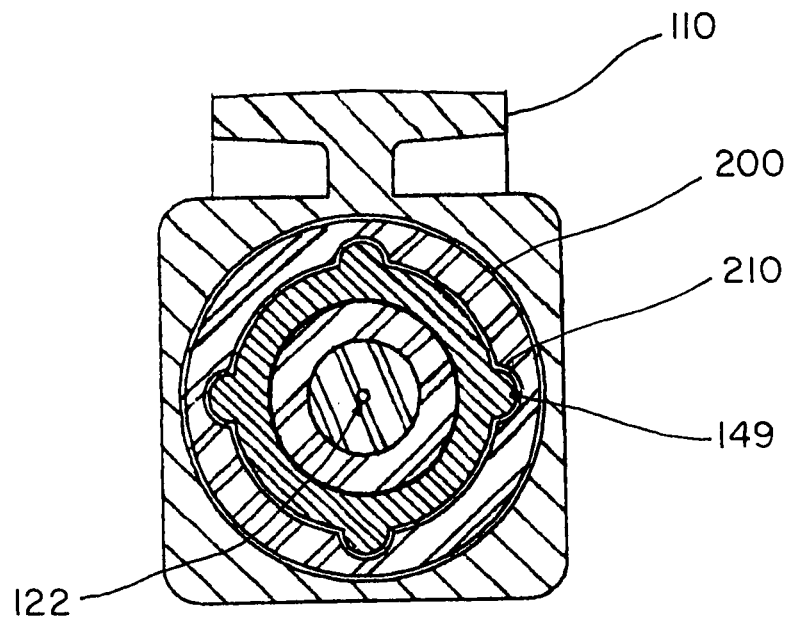
FIG. 24 shows a cross-section of a ferrule holder assembly and a cam termination tool before termination.
Figure 25:
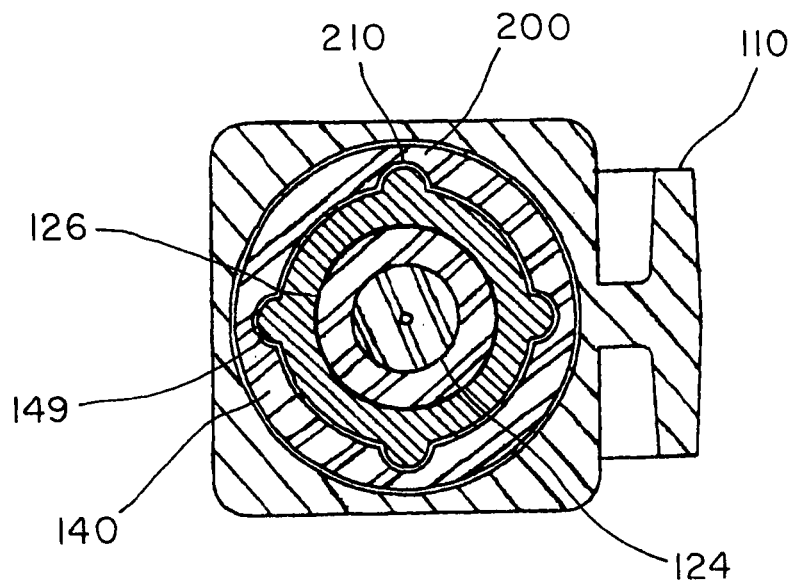
FIG. 25 shows a cross-section of the ferrule holder assembly and cam termination tool after termination.

FIGS. 24-25 illustrate a section of the ferrule holder assembly 140 both before and after termination, respectively. Termination is attained by use of a cam termination tool 200 having a plurality of keyways 210 spaced around an inner periphery that mate with and engage a corresponding one of a plurality of keys 149 provided on the outer circumference of ferrule holder assembly 140. During termination, connector housing 110 is rotated 90 degrees, as shown in FIG. 25. During this rotation, only housing 110 rotates. Because cam tool 200 is fixed in position, ferrule holder assembly 140 and stub ferrule assembly 120 do not move. Alternatively, housing 110 could be fixed and cam tool 200 rotated to rotate ferrule holder assembly 140 and stub fiber assembly 120 relative to the housing 110.

Figure 26:
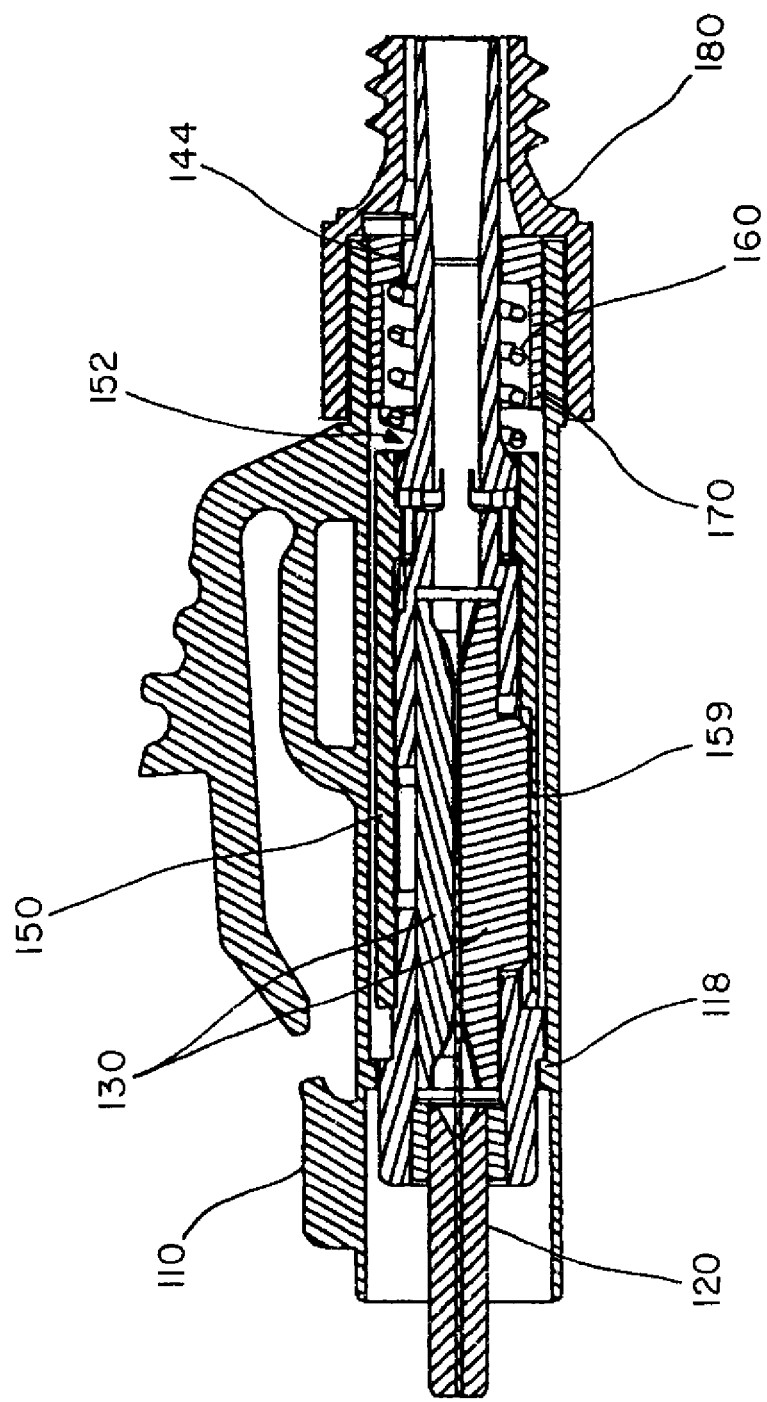
FIG. 26 shows a cross-section through the longitudinal centerline of the LC connector assembly in an unmated condition before termination.
Figure 27:
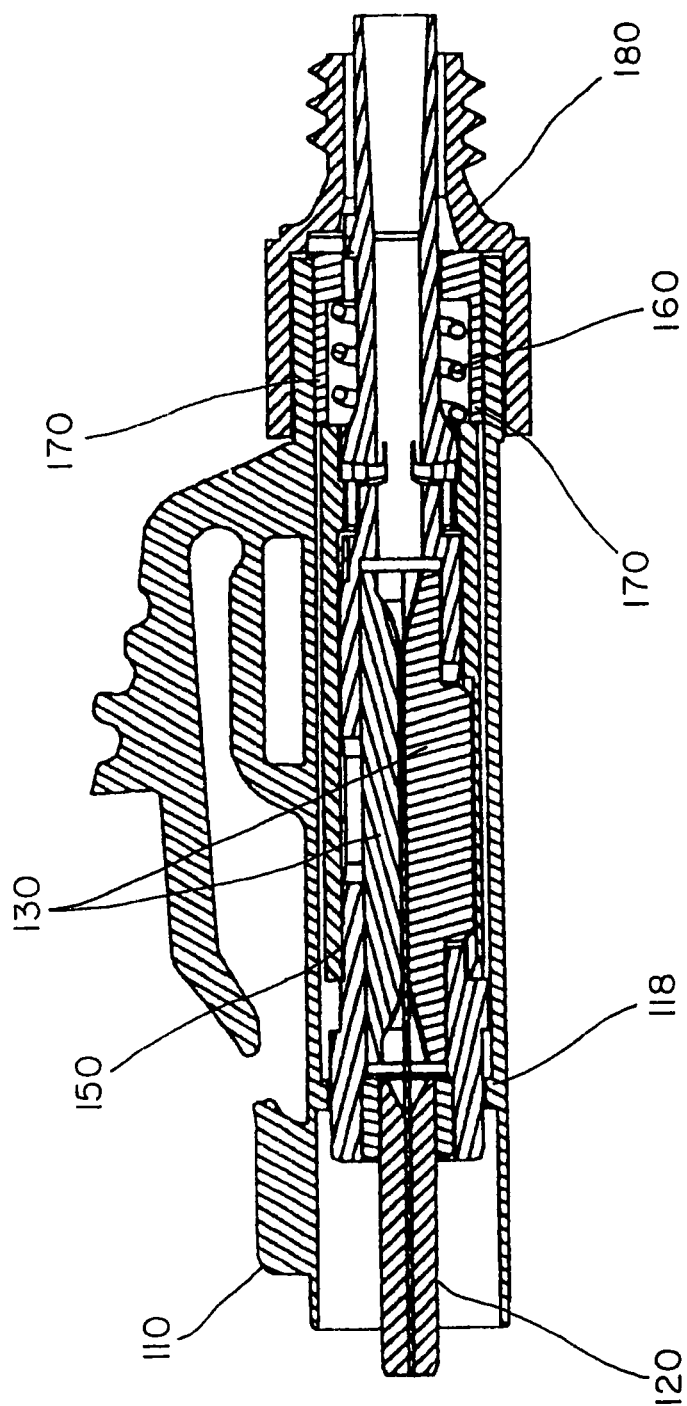
FIG. 27 shows a cross-section through the longitudinal centerline of the LC connector assembly or FIG. 26 at full spring travel condition before termination.

FIGS. 26-27 are side cross-sectional views down the longitudinal centerline that show additional detail of the various cam assembly components. FIG. 26 is in an unterminated but assembled state. FIG. 27 shows the assembly at a full spring travel condition before termination. This view shows the stop structure designed in the connector housing 110 that restricts travel of ferrule holder assembly 140 and stub fiber assembly inside housing 110 and eliminates full compression of spring 160 to a solid height.

FIGS. 28-42 show various tools that can be used to terminate the LC connector assembly 100 described in the above embodiments. Exemplary LC cam tools include an Opti-Cam termination tool 300 that receives and assists in termination and optional diagnostics of the connector assemblies 100 and a cam tool 200 that engages with components within the connector assembly, preventing them from rotation when the remainder of the connector housing is rotated between an initial uncammed position and a cammed termination position. Additionally, a patchcord 400 may be connected between termination tool 300 and the LC connector assembly 100 through the cam tool 200.

Particular details of the termination tool 300 and cam tool 200 are described with reference to FIGS. 29-39. FIGS. 29-33 show features of the interconnection between cam tool 200 and connector assembly 100. In particular, a first exemplary embodiment of cam tool 200 includes a main body 220 containing a front bore 250 in which are provided at least one, and preferably a plurality of keying grooves or keyways 210 sized and spaced to mate with corresponding key 149 provided on ferrule holder assembly 140 of connector assembly 100. Cam tool also preferably includes a rear bore 260 that is in communication with front bore 250 such that a throughbore is provided. Cam tool 200 also preferably includes a groove 230 that extends over at least a portion of the circumference of main body 220. Groove 230 provides a retention element that helps constrain one or more degrees of freedom of movement of cam tool 200 relative to termination tool 300. Cam tool 200 also may include a lever 240 formed as a projection extending radially and longitudinally from the cam tool. Cam tool lever 240 can serve several functions, including use as a manual handle and as a further retention structure for constraining movement of the cam tool when mounted in termination tool 300.

In the illustrated embodiment, four internal keyways 210 are symmetrically provided within bore 250 and four external symmetrical projecting keys 149 are provided on ferrule holder assembly 140. However, the size, shape and location of the keys and corresponding keyways can be varied to any desirable pattern that can achieve an interlocking function in which the cam tool 200 and desired portions of connector assembly 140 are interlocked and prevented from substantial rotation relative to each other. Moreover, the size and shape of the outer periphery of ferrule holder assembly 140 and size and shape of front bore 250 can be changed, so long as the leading edge portion of ferrule holder assembly 140 is capable of being received within the front bore 250 and interlocking contact is made between keyways 210 and keys 149. Thus, when the cam tool 200 is properly mated with connector assembly 100, cam tool 200 is partially received over at least a portion of the ferrule holder assembly 140 of connector assembly 100.

Details of termination tool 300 will be described with reference to FIGS. 34-39. Termination tool 300 includes an LC cradle 310 that provides a support surface for receiving and supporting a movable LC connector assembly 100 during termination procedures. LC cradle 310 includes an upwardly projecting rear support 320 and an upwardly projecting front support 330. Rear support 320 is sized and shaped to receive and partially constrain a rear portion of the housing 110 of LC connector assembly 100. In the illustrated embodiment, rear support 320 includes two upstanding side walls 322 and a recess 324 shaped to support and receive at least a lowermost portion of the LC connector assembly housing. This constraint preferably allows limited linear movement of connector assembly 100 in the direction of the arrow in FIG. 35 and rotation about the longitudinal axis of the connector assembly 100, while constraining lateral motion.

Figure 34:
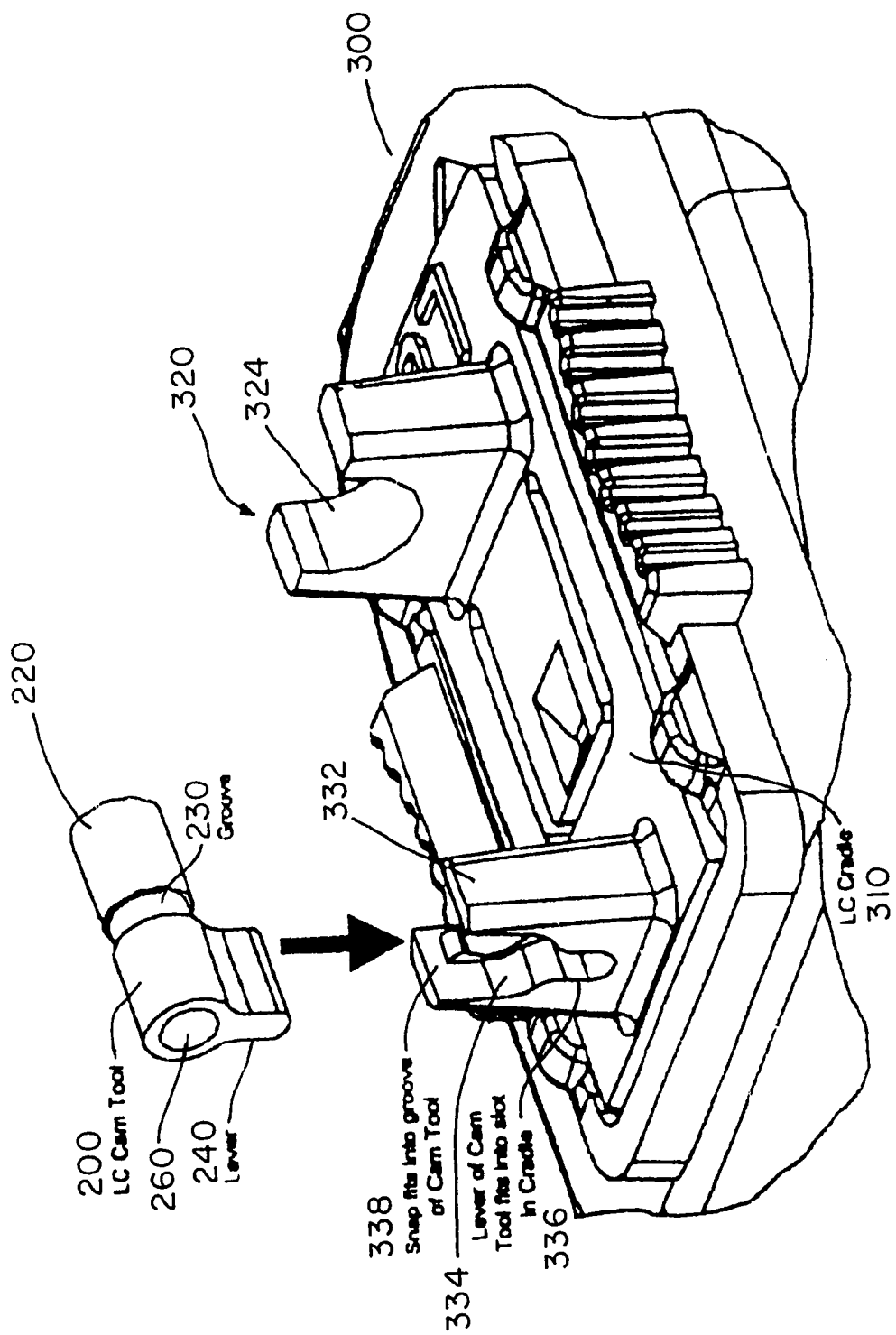
FIG. 34 is a partial view of the LC Opti-Cam termination tool of FIG. 28 showing a cradle that receives an LC connector and LC cam tool.

Front support 330 also includes upstanding side walls 332 and a recess 334. In this exemplary embodiment, front support 330 is also provided with a second recess portion 336 sized and shaped to accommodate lever 200 of cam tool 200 while recess 334 is sized and shaped to accommodate the main body 220 of cam tool 200. As shown in FIG. 34, cam tool 200 is moved in the direction of the arrow and secured to front support 330 by one or more retention structures. One such retention structure is attained by designing the shape of the recesses 334 and 336 and the flexibility of sidewalls 332 to tightly hold the cam tool within support 330. The provision of the second recess 336 and projecting lever 240 act to prevent rotation of cam tool 200 relative to front support 330. The snap fit of the two components may also constrain longitudinal and lateral movement of cam tool 200. However, longitudinal constraint can be further constrained by provision of a snap fit groove 338 within recess 334 that mates with groove 230 of cam tool 200.

Termination of the LC connector assembly 100 will be described with reference to FIGS. 35-39. As shown in FIG. 35, cam tool 200 is mounted within front support 330. LC connector assembly 100 is then positioned in rear support 320 and slid longitudinally in the direction of the arrow into engagement with cam tool 200. That is, until keyways 210 engage with corresponding keys 149 of the ferrule holder assembly. Once engaged, cam tool 200, being itself locked from rotation by front support 330, acts to prevent rotation of ferrule holder assembly 140.

Figure 28:
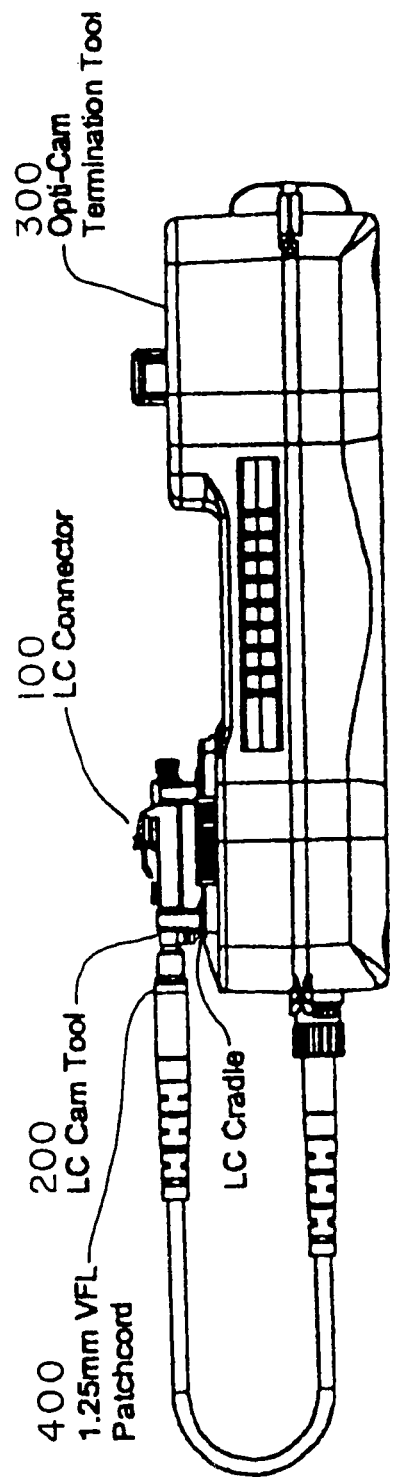
FIG. 28 is a side view of an exemplary LC Opti-Cam connector termination tool.

As shown in FIG. 36, a first end of a patchcord 400, such as a 1.25 mm VFL patchcord, can be inserted through rear bore 260 of the cam tool 200 into engagement with the stub fiber assembly of connector 100. The second end of patchcord 400 can then be connected to a corresponding terminal of termination tool 300 (FIG. 28). Termination tool 300 can include appropriate known mechanical, optical and/or electrical devices to detect and/or diagnose operation of the optical fiber connection being terminated.

Figure 37:
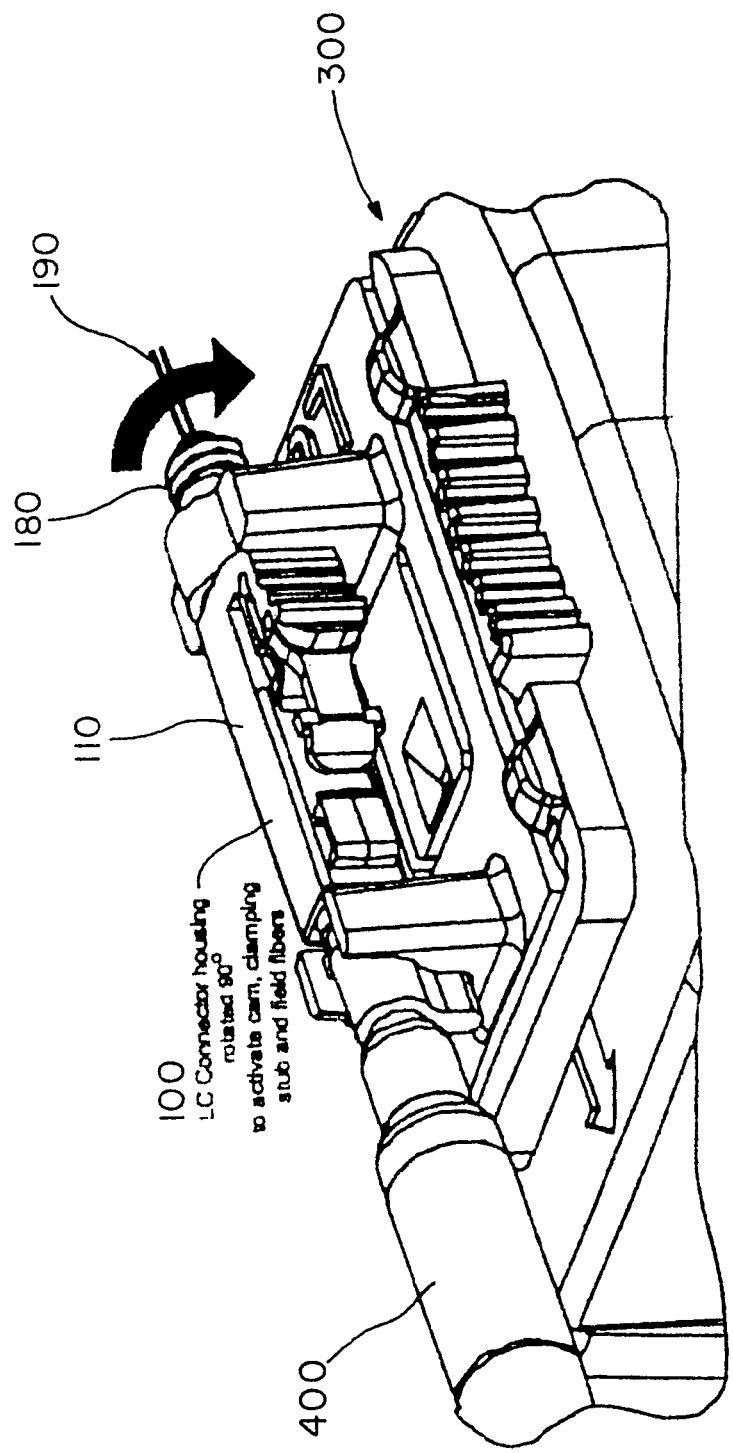
FIG. 37 is a partial view of the LC cradle with a field fiber inserted into the LC connector and the connector being rotated 90 degrees to clamp the field fiber.

In the state shown in FIG. 36, the fiber optic components within connector assembly 100 are in an unterminated state. A fiber optic cable 190 including a field fiber (unshown) may then be inserted through the backbone of connector assembly 100 as shown in FIG. 37 until the field fiber is extended between the planks and into substantial abutment against the stub fiber. Then, LC cradle 310 may be pushed backwards to create a bow in the field fiber. At this time, the connector housing 110 of connector assembly 100 is rotated a predetermined amount, e.g., 90 degrees in this illustrated embodiment. This rotates components within connector assembly 100 to cause a camming action that clamps the stub fiber and field fiber within planks 130. While still in the termination tool 300, the just terminated connection can be tested using patchcord 400. If the termination is successful, the termination connector assembly 100 can be removed from the termination tool 300 by upward lifting. Terminated connector 100 can then also be removed from cam tool 200 to than a field terminated optical fiber.

Figure 38:
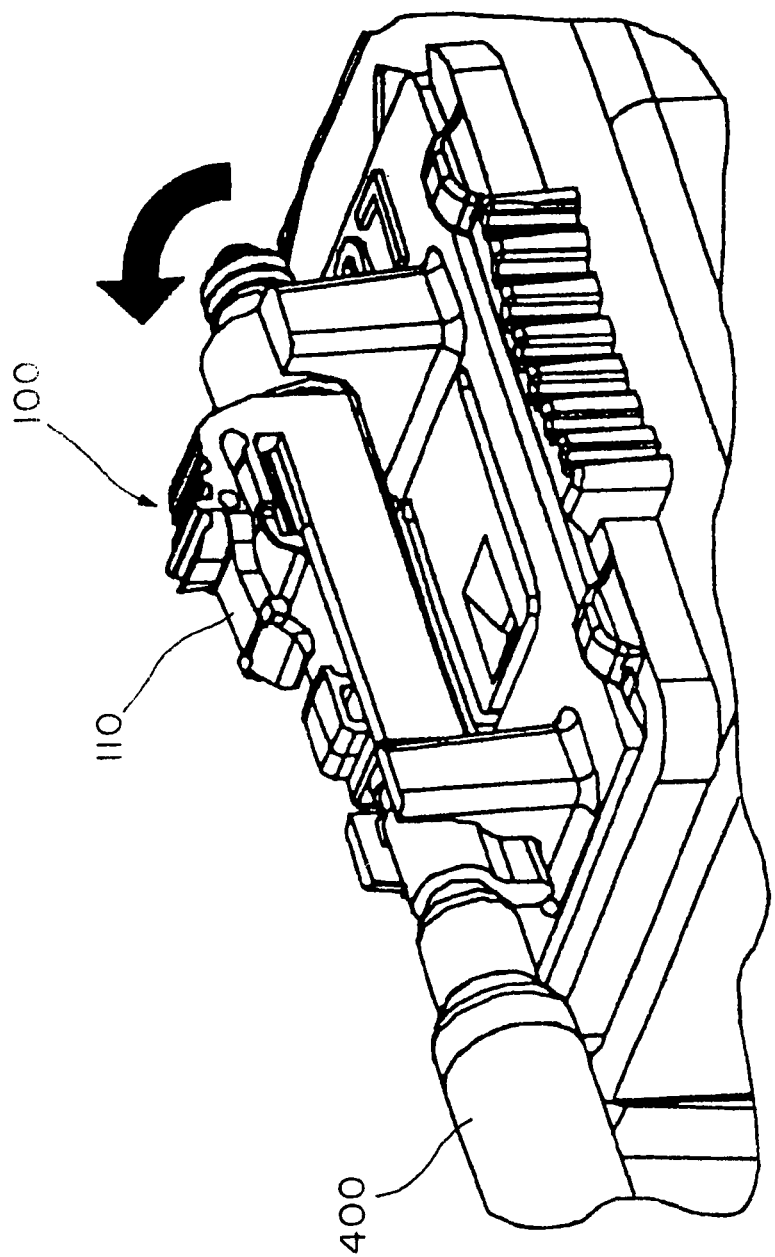
FIG. 38 is a partial view of the LC cradle with a field fiber inserted into the LC connector and the connector being rotated in an opposite direction 90 degrees to unclamp the field fiber, allowing removal or repositioning.

In the event of a poor termination, the housing 110 can be rotated in an opposite direction as shown in FIG. 38. This disengages the clamping action of the planks and various detents and reverses the termination of the field and stub fibers. The field fiber can then be removed from, or repositioned in, the connector assembly at which time a subsequent termination procedure can be initiated to establish a proper termination. Thus, the connector assembly is reterminable and includes reversible termination structure that can be terminated and unterminated while situated within termination tool 300. Moreover, by integration of the termination tool with patchcord 400 and associated testing equipment, field testing of the connection can be achieved at the time of termination, greatly improving field termination efficiency.

Figure 39:
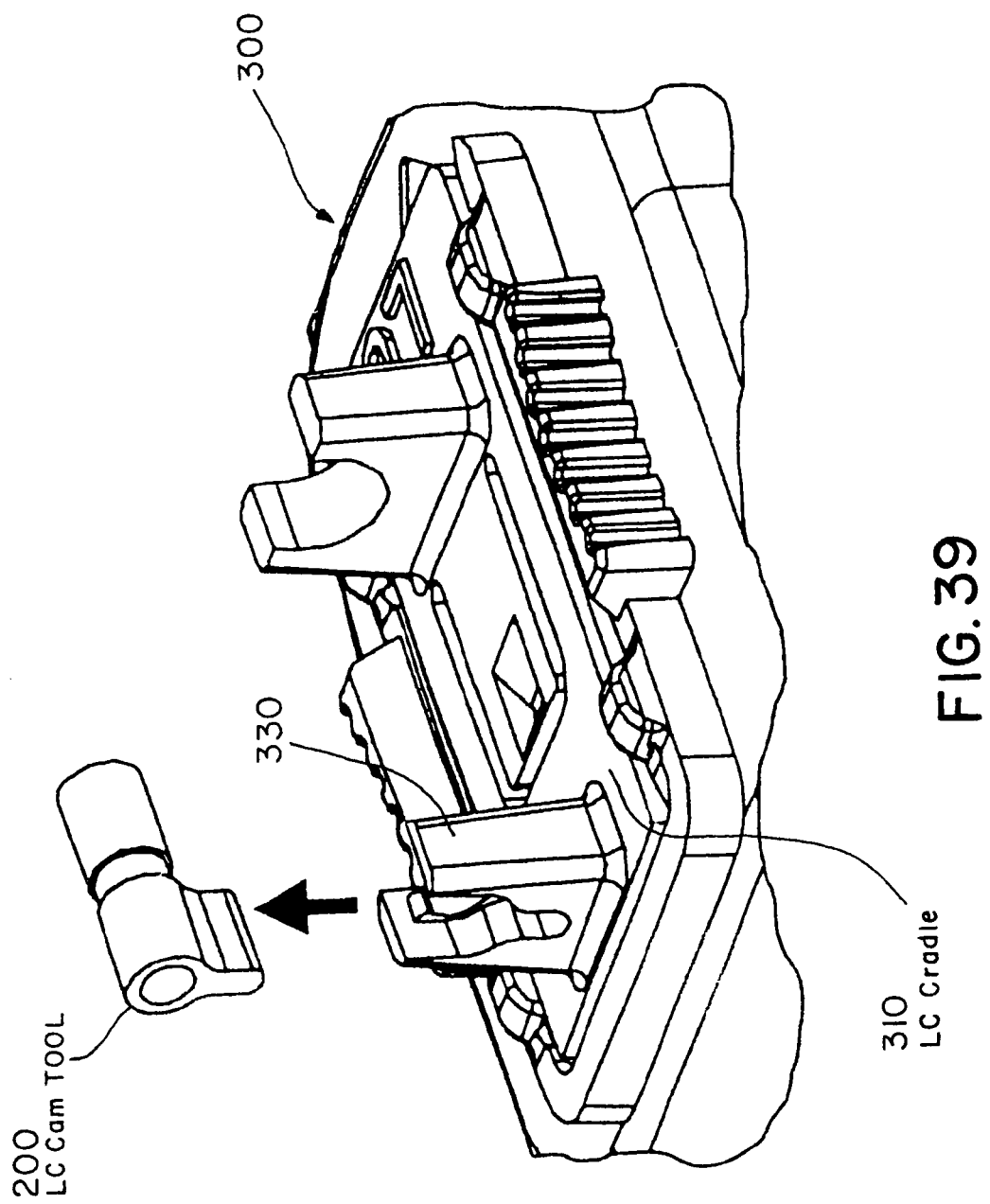
FIG. 39 is a partial view of the LC cradle showing the LC cam tool being removed.

Although cam tool 200 is designed for use with termination device 300, cam tool 200 can be removed from termination tool 300 and used independently (FIG. 39). This can be achieved by pulling tool 200 upward in the direction of the arrow out of the snap-fit connection. This may be desired to uncam the connector in case of a poor termination.

Figure 40:
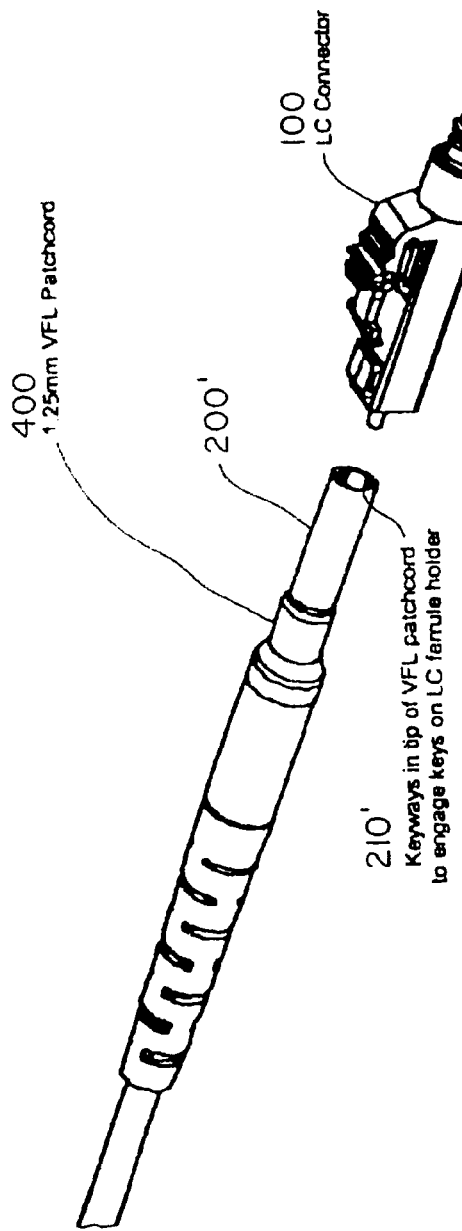
FIG. 40 is a perspective view of an alternative LC cam tool incorporated into a patchcord.
Figure 41:
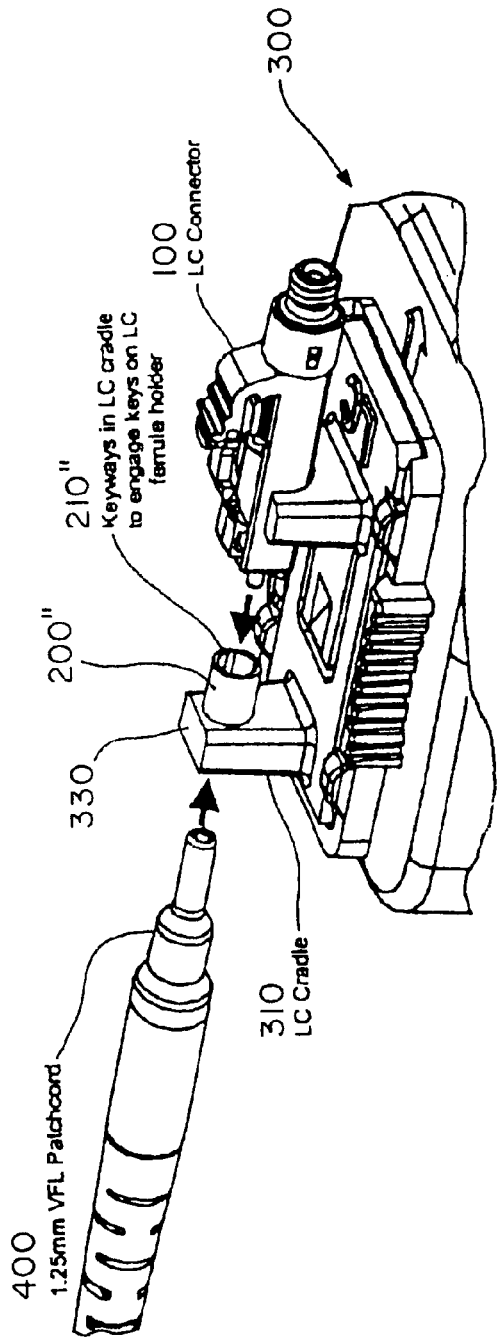
FIG. 41 is a perspective view of an alternative LC cam tool built into the LC cradle.
Figure 42:
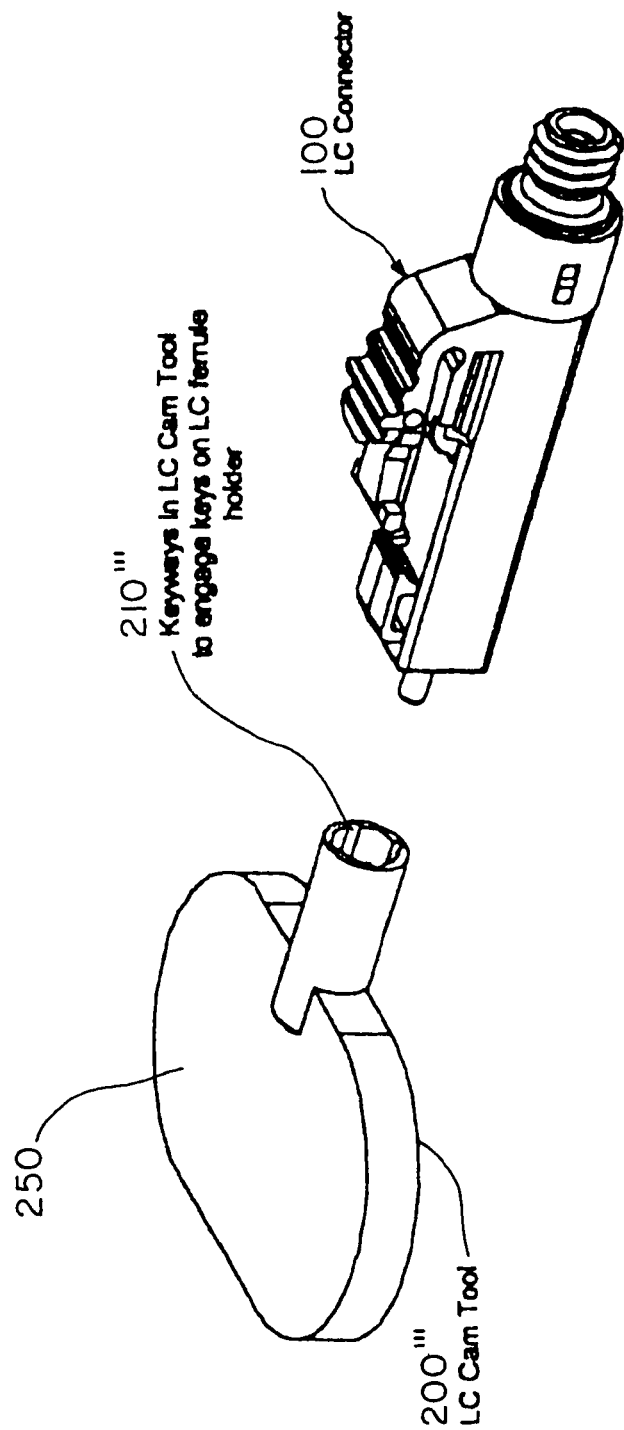
FIG. 42 is a perspective view of yet alternative LC cam tool having an enlarged handle.

There are various other configurations of cam tool 200 that are possible. A first alternative cam tool 200' is shown in FIG. 40. In this embodiment, cam tool 200' is integrated into a test patchcord 400', such as a 1.25 mm VFL patchcord. As in the prior embodiment, cam tool 200' includes appropriate keyways 210'. A second alternative is shown in FIG. 41, in which a cam tool 200" is built into the LC cradle 310 and forms the front support of termination tool 300. As in the first embodiment, cam tool 200" can include a throughbore that allows connection of a patchcord 400" through the cam tool into engagement with connector assembly 100. A third alternative cam tool 200''' is shown in FIG. 42. In this alternative, the cam tool is a separate tool used to manually actuate the Opti-cam mechanism within connector assembly 100 without the use of termination tool 300. In this embodiment, an installer would load the field fiber through the back of the connector assembly 100 as in prior embodiments. The cam tool 200''' would then be moved into engagement with the connector assembly and either the cam tool 200''' or the housing 110 rotated relative to the other to activate the cam and terminate the fiber. This cam tool 200''' could also be used to uncam or release the termination of a fully terminated connector so as to reverse the termination, allowing either a repositioning of the field fiber to improve operation, or substitution of a new field fiber to form a terminated connection. Thus, the disclosed connector system is completely reterminable.

The exemplary embodiments set forth above are intended to be illustrative, not limiting. Various changes may be made without departing from the spirit and scope of the invention. Therefore, the systems and methods according to this invention are intended to embrace all known, or later-developed, alternatives, modifications, variations, and/or improvements.

The invention claimed is:

1. A fiber optic stub fiber connector for reversibly and nondestructively terminating an inserted field fiber comprising:
   a housing with a bore located at a front of the housing;
   a ferrule including a stub fiber disposed within;
   a ferrule holder retaining the ferrule, the ferrule holder having a keyed structure located at a front of the ferrule holder such that the keyed structure of the ferrule holder can be accessed via the bore; and
   a reversible actuator configured to provide termination of the field fiber to the stub fiber and to provide strain relief to the field fiber when the housing is rotated in a first direction relative to the ferrule holder, the reversible actuator also configured to nondestructively reverse the termination and the strain relief when the housing is rotated in a second direction relative to the ferrule holder, wherein the first direction is substantially opposite the second direction.

2. The fiber optic stub fiber connector of claim 1 wherein the reversible actuator includes a cam.

3. The fiber optic stub fiber connector of claim 2 wherein the cam includes at least two cam surfaces, a first of the at least two cam surfaces for reversibly and nondestructively terminating the field fiber to the stub fiber and a second of the at least two cam surfaces for providing reversible and nondestructive strain relief to the buffer.

4. The fiber optic stub fiber connector of claim 3 wherein the reversible actuator further includes at least one plank, the first cam surface configured to interact with a rib protruding from the at least one plank.

5. The fiber optic stub fiber connector of claim 4 wherein the reversible actuator further includes a buffer clamp with a cam following surface configured to interact with the second cam surface.

6. The fiber optic stub fiber connector of claim 4 wherein the at least one plank comprises a first and second plank.

* * * * *